(12) United States Patent
Weiler et al.

(10) Patent No.: US 9,294,176 B2
(45) Date of Patent: Mar. 22, 2016

(54) TRANSMITTER

(71) Applicant: Fraunhofer-Gesellschaft zur Foerderung der angewandten Forschung e.V., Munich (DE)

(72) Inventors: Richard Weiler, Berlin (DE); Wilhelm Keusgen, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 14/446,363

(22) Filed: Jul. 30, 2014

(65) Prior Publication Data

US 2014/0341261 A1 Nov. 20, 2014

Related U.S. Application Data

(63) Continuation of application No. PCT/EP2013/051632, filed on Jan. 29, 2013.

(30) Foreign Application Priority Data

Jan. 31, 2012 (EP) .................................. 12153262

(51) Int. Cl.
| | |
|---|---|
| H04B 1/04 | (2006.01) |
| H04B 7/06 | (2006.01) |
| H01Q 3/26 | (2006.01) |
| H01Q 3/40 | (2006.01) |
| H04B 1/44 | (2006.01) |
| H04W 76/02 | (2009.01) |

(52) U.S. Cl.
CPC .............. *H04B 7/0608* (2013.01); *H01Q 3/40* (2013.01); *H04B 1/44* (2013.01); *H04B 7/0678* (2013.01); *H04W 76/02* (2013.01)

(58) Field of Classification Search
CPC .. H04B 1/0458; H04B 7/0602; H04B 7/0608; H04B 7/0678; H04B 10/50572; H04B 14/004; H01Q 3/40; H01Q 3/26
See application file for complete search history.

(56) References Cited

U.S. PATENT DOCUMENTS

| | | | | |
|---|---|---|---|---|
| 5,402,132 | A * | 3/1995 | Hall ....................... | H01Q 21/29 342/429 |
| 2003/0179833 | A1* | 9/2003 | Porco ....................... | H04L 5/06 375/297 |
| 2004/0121809 | A1* | 6/2004 | Wallace ............... | H04B 7/0615 455/562.1 |

(Continued)

OTHER PUBLICATIONS

Gesbert, D. et al., "From Theory to Practice: An Overview of MIMO Space-Time Coded Wireless Systems", IEEE Journal on Selected Areas in Communications, vol. 21, No. 3, Apr. 2003, pp. 281-302.

(Continued)

*Primary Examiner* — Andrew Wendell

(74) *Attorney, Agent, or Firm* — Keating & Bennett, LLP

(57) ABSTRACT

Embodiments of the present invention provide a transmitter including a plurality of amplifier circuits, a plurality of antennas adapted to have different main transmit directions and a transformation unit. The transformation unit includes a plurality of inputs connected to the plurality of amplifier circuits and a plurality of outputs connected to the plurality of antennas. The transformation unit is configured to transform a plurality of amplified transmit signals present at the plurality of inputs into a combined power transmit signal and to provide the combined power transmit signal at one of the plurality of outputs.

11 Claims, 15 Drawing Sheets

(56) References Cited

U.S. PATENT DOCUMENTS

| | | | |
|---|---|---|---|
| 2006/0006945 A1* | 1/2006 | Burns | H03F 3/211 330/295 |
| 2008/0192849 A1* | 8/2008 | Kim et al. | 375/260 |
| 2009/0129497 A1* | 5/2009 | Stopler | H04L 25/0204 375/267 |
| 2010/0073260 A1* | 3/2010 | Fujita | 343/904 |
| 2011/0241968 A1* | 10/2011 | Oota | H01Q 19/06 343/853 |
| 2011/0273355 A1* | 11/2011 | Ahn et al. | 343/860 |

OTHER PUBLICATIONS

Rotman, W. et al., "Wide-Angle Microwave Lens for Line Source Applications", IEEE Transactions on Antennas and Propagation, Nov. 1963, pp. 623-632.

Godara, L., "Application of Antenna Arrays to Mobile Communications, Part II: Beam-Forming and Direction-of-Arrival Considerations", Proceedings of the IEEE, vol. 85, No. 8, Aug. 1997, pp. 1195-1245.

Schmidt, R., "Multiple Emitter Location and Signal Parameter Estimation", IEEE Transactions on Antennas and Propagation, vol. AP-34, No. 3, Mar. 1986, pp. 276-280.

Chung, P. et al., "Recursive EM and SAGE-Inspired Algorithms With Application to DOA Estimation", IEEE Transactions on Signal Procssing, vol. 53, No. 8, Aug. 2005, pp. 2664-2677.

Love, D. et al., "Equal Gain Transmission in Multiple-Input Multiple-Output Wireless Systems", IEEE Transactions on Communications, vol. 51, No. 7, Jul. 2003, pp. 1102-1110.

Wu, S. et al., "Planar Arrays Hybrid Beamforming for SDMA in Millimeter Wave Applications", IEEE, 2008, 6 pages.

Ecma International, "Standard ECMA-387: High Rate 60GHz PHY, MAC and HDMI PAL", Dec. 2008.

\* cited by examiner

TRANSMITTER

CROSS-REFERENCE TO RELATED APPLICATIONS

This application is a continuation of copending International Application No. PCT/EP2013/051632, filed Jan. 29, 2013, which is incorporated herein by reference in its entirety, and additionally claims priority from European Application No. EP 12153262.6, filed Jan. 31, 2012, which is also incorporated herein by reference in its entirety.

BACKGROUND OF THE INVENTION

Embodiments of the present invention relate to a transmitter. Further embodiments of the present invention relate to a transceiver. Some embodiments of the present invention relate to an electrically controllable directional antenna. Some embodiments of the present invention relate to a switched beam power combiner.

FIG. 1 shows a block diagram of a plurality of radio stations that are communicating by means of high frequency signals. Thereby, in FIG. 1 four radio stations $10_1$ to $10_4$ are shown by way of example. Each radio link (or radio communication) $12_1$ to $12_5$ is operated in both directions, i.e. bidirectional. Moreover, each radio station $10_1$ to $10_4$ comprises a combined transmit receive unit (transceiver) having a downstream signal processing (unit) $14_1$ to $14_4$ and a common antenna $16_1$ to $16_4$ for transmitting and receiving (or two separate antennas for transmitting and receiving). Each of the antennas $16_1$ to $16_4$ can comprise a plurality of interconnected or combined radiating elements. Furthermore, each radio station $10_1$ to $10_4$ is configured to set-up simultaneous radio links to one or more adjacent radio stations, or even to all radio stations $10_1$ to $10_4$, e.g. as shown in FIG. 2. Thereby, the radio links $12_1$ to $12_5$ form a network structure with the individual radio stations $10_1$ to $10_4$ as nodes. Note that in FIG. 2, a three dimensional Cartesian coordinate system is shown for illustration purposes. The Cartesian coordinate system comprises a x-axis, a y-axis and a z-axis, wherein the x-axis and the y-axis span a horizontal plane perpendicular to an earth gravitational vector, and wherein the z-axis (altitude) is parallel to the earth gravitational vector. Since differences in altitude (z-axis) between the individual radio stations $10_1$ to $10_4$ are small compared to distances between the radio stations $10_1$ to $10_4$, the spatial position of the individual radio stations $10_1$ to $10_4$ is primarily characterized by their horizontal angle or azimuthal angle (angle in the horizontal plane, e.g. relative to the x-axis or y-axis) $20_1$ and $20_2$.

FIG. 3 shows a block diagram of the radio stations $10_1$ to $10_4$ shown in FIG. 1, wherein two of the four radio stations $10_1$ to $10_4$ are configured as transmitters $10_1$ and $10_4$ and the other two as receivers $10_2$ and $10_3$. In order to increase the operating range (coverage) for a given transmit power, or even to implement a secure radio link $12_1$, $12_3$ or $12_5$, the high frequency signals can be bundled by the antennas $16_1$ and $16_4$ of the transmitters $10_1$ and $10_4$ and be radiated (or transmitted) mainly in the direction of the receivers $10_2$ and $10_3$. Bundling of the beams can be performed by appropriate beam patterns $30_1$ to $30_3$ with distinctive main lobes. Amplification of the radio signals can be effected additionally or alternatively by beam patterns $30_4$ to $30_6$ on the receiver side. If the direct line of sight is blocked, e.g. by an obstacle 32, then a directed radio link $12_3$ can be set-up by means of an appropriate reflector 34. In FIG. 3 only unidirectional radio links $12_1$, $12_3$ and $12_5$ are shown by way of example, wherein an extension to bidirectional radio links can be performed by means of exchanging transmitters $10_1$ and $10_4$ and receivers $10_2$ and $10_3$. Hence, by means of forming (or generating) appropriate beam patterns, each transmitter is capable of radiating the transmit power simultaneously in one or more azimuthal directions and each receiver is capable of receiving signals from one or more azimuthal directions. Generally, the positions of the radio stations $10_1$ to $10_4$ are not fixed but variable, such that the alignment of the beams or main lobes has to be carried out dynamically.

Moreover, for a secure operation, the radio system necessitates that the transmit signals have a particular minimal power. The generation of the necessitated transmit power is particularly challenging for micro or millimeter wave radio systems.

Typical applications for the radio system shown in FIG. 1 are meshed outdoor networks, e.g. for a radio communication between vehicles, buildings or radio masts.

The simultaneous and adaptive formation of multiple main lobes is so far possible with MIMO signal processing (MIMO=Multiple Input Multiple Output). In these systems each antenna element (or radiating element) is connected via a separate transceiver and a separate digital-to-analog converter or analog-to-digital converter to a common digital signal processing (unit). The signal processing (unit) performs for each desired main lobe a separate complex weighting of the antenna signals, e.g. as described in D. Gesbert, M. Shafi, S. Da-shan, P. Smith and A. Naguib, "From theory to practice: an overview of MIMO space-time coded wireless systems", *Selected Areas in Communications, IEEE Journal on*, vol. 21, no. 3, pp. 281-302, April 2003. The MIMO signal processing allows any manipulation of the transmit and receive signals not only for the entire signal but also for individual signal components in the time or frequency domain. Hence, the MIMO signal processing is very flexible and efficient. Thereby, all antenna elements contribute to the formation of the main lobes, wherein each antenna element usually comprises a low directivity. This solution offers the greatest flexibility at the highest effort because a transceiver including a converter is necessitated for each antenna element (or radiating element). The antenna array is usually planar and hence covers only an azimuthal angle of 120°. In principle, a curved or circular arrangement of the antenna elements (or radiating elements) is also possible in order to achieve a 360° covering. In this case, not all antenna elements can contribute to the formation of a specific main lobe, which results in a poor exploitation of the already complex system.

Besides, there is the possibility of using antenna arrays having switchable fixed main lobes (switched beam antennas). In this case, the antenna elements are connected via a change-over switch to the transceiver, such that at all times only one specified antenna element having a corresponding main lobe is active. The desired high directivity is realized within each antenna element (or radiating element). With this easy approach a simultaneous formation of main lobes is not possible. A more complex switched beam antenna can be realized by means of a Butler matrix or Rotman lens, e.g. as described in W. Rotman and R.F. Turner, "Wide-Angle Microwave Lens for Line Source Applications," *IEEE Transactions on Antennas and Propagation*, November 1963. Thereby, the main lobes are formed by all antenna elements (or radiating elements) together, wherein the Butler matrix or Rotman lens comprises a separate input for each main lobe. Thus, the single antenna element has only a low directivity. If the transceiver is switched to one or more inputs, then one or more simultaneous main lobes can be formed. Switched beam antennas are predominantly assembled with planar antenna arrays with a consequently limited angular range in an azimuthal direction. In principle, a curved or circular arrangement is conceivable, but in this case as well not all antenna elements contribute to the formation of the main lobes resulting in the same disadvantages as in the antenna arrays with MIMO signal processing. Planar switched beam antennas with a Rotman lens are mainly applied in simple radar systems, e.g. for vehicles.

With mechanically rotating antennas the desired directivity is achieved by a single antenna element (or radiating element) that is rotated or tilted in the desired azimuthal direction. Advantageous is the perfect angular coverage of 360° and the relatively low technical effort, e.g. only one transceiver is necessitated, while the mechanical inertia and the fact that it is not possible to form more than one main lobe at the same time is disadvantageous. Mechanically rotatable antennas are primarily used for ship or plane radars.

Moreover, when using phased array antennas, the signals of individual antenna elements (or radiating elements) are weighted with complex factors (e.g. amplitude and phase), e.g. as described L. C. Godara, "Application of Antenna Arrays to Mobile Communications, Part II: Beam-Forming and Direction-of-Arrival Considerations," *Proceedings of the IEEE*, vol. 85, no. 8, August 1997. Hence, each transmit antenna receives an identical, but individually weighted, signal. On the receiver side the individual antenna signals are individually weighted and added. In contrast to antenna arrays with MIMO signal processing, a complete transceiver for each antenna element (or radiating element) is not necessarily necessitated, e.g. a realization with an analog phase shifter for each antenna element may be sufficient. In this case a common transceiver can be used. An upstream or downstream signal processing (unit) on the transmitter or receiveer side thus has no influence on the individual antenna signals. With phased array antennas all antenna elements contribute to the formation of the main lobes. Thus, the single antenna elements only necessitate a small directivity. A planar arrangement of the antennas comprises a restricted angular coverage, wherein curved or circular arrangements have the above mentioned disadvantages. A simultaneous formation of multiple main lobes is limited and has a worse performance than with MIMO signal processing. Therefore, usually no use is made of this possibility. Phased array antennas are primarily used in radar systems and satellite communication, especially for replacing mechanically rotatable antennas.

There are several technical solutions for estimating the direction that differ in complexity of the transmit receive unit (transceiver) and the usable propagation conditions.

Systems with MIMO signal processing comprise the highest complexity because each transmit and receive antenna necessitates a separate transmit receive module. There are numerous known methods for estimating the direction with MIMO signal processing that are applied to mobile communication, e.g. the MUSIC (multiple signal classification) or ESPRIT (estimation of signal parameters via rotational invariance techniques) methods described in R. O. Schmidt, "Multiple Emitter Location and Signal Parameter Estimation," *IEEE Transactions on Antennas and Propagation*, vols. AP-34, no. 3, March 1986.

In systems with beamforming signal processing only one transceiver is necessitated per radio station. Numerous methods are known for direction estimation with beamforming signal processing, e.g. as described in P.-J. Chung and J. F. Böhme, "Recursive EM and SAGE-Inspired Algorithms With Application to DOA Estimation," *IEEE Transactions on Signal Processing*, vol. 53, no. 8, August 2005, D. J. Love and R. W. Heath, "Equal Gain Transmission in Multiple-Input-Multiple-Output Wireless Systems," *IEEE Transactions on Communications*, Vol. 52, no. 7, July 2003, and S.-H. Wu, L.-K. Lin and S.-J. Chung, "Planar arrays hybrid beamforming for SDMA in millimeter wave applications," *Personal, Indoor and Mobile Radio Communications, PIMRC 2008, IEEE 19th International Symposium on*, pp. 1-6, 2008. These methods are used, for example, for inter-communication using millimeter waves, e.g. as described in ECMA International, Standard ECMA-387: High Rate 60 GHz PHY, MAC and HDMI PAL, Geneva, 2008. These known approaches achieve their greatest performance in multi-path propagation channels. In the communication scenario shown in FIG. 1, an undisturbed line of sight or a single reflection (FIG. 3) of the main propagation path is assumed.

Besides, there is still the possibility to directly evaluate location information in order to calculate the spatial direction (azimuthal directions) of the transmit and receive antennas when the position of adjacent transceivers is known. Thereby, the location information can be obtained by means of satellite navigation, e.g. GPS (global positioning system). This solution necessitates that each transceiver is capable of performing a location determination and that each transceiver is capable of communicating this information to the other nodes of the network. Hence, each transceiver has to comprise a receiver for the satellite navigation and there has to be the possibility for a non-directional wireless data communication, such that the location information can be exchanged before the main lobes are formed. So far this method is used for dynamic alignment of phased array antennas towards airplanes for communicating with satellites.

In many application cases it is not possible or technically not feasible to generate high transmit powers in an integrated semiconductor. A further parallelization on the semiconductor device would result in large area consumption and high costs and is therefore often not feasible. Furthermore, a high performance cooling concept would be necessitated in order to dissipate the concentrated dissipation power.

For the generation of the necessitated power usually multiple power amplifiers are built up discretely and their outputs are combined. Previous solutions to this problem can be separated according to how the output signals of the power amplifiers are combined. When using mechanically oriented directional antennas as well as mechanically oriented directional antennas the power is merged in a power combiner. Power combiners usually comprise cascaded Wilkinson power combiners or 90°-hybrids. These can combine the signals of two inputs to an impedance-controlled output. For example, if $2^n$ amplifiers should be parallelized, then this can be done by means of a binary tree structure comprising n levels. Depending on the number of amplifiers, these structures can adopt a large structural shape. Furthermore, losses of the power combiner increase with an increasing number of amplifiers, such that from a certain number of amplifiers no significant increase of output power can be achieved. Moreover, inequalities of individual amplifiers may also lead to losses.

When using MIMO signal processing with separate transceivers per antenna, the signals of the amplifiers are combined in the air as electromagnetic waves, such that the power combiner as a dedicated component can be omitted.

More complex systems with beamforming signal processing comprise separate transceivers per antenna element (or radiating element) as well. The complex weighting is thereby integrated in the transceivers. Separation or combination of the weighted antenna signals can be performed directly downstream the digital-to-analog conversion or directly before the upstream analog-to-digital conversion. The combination of the transmit signals of the individual transmit amplifiers takes place in the air as electromagnetic waves as well.

SUMMARY

According to an embodiment, a transmitter may have: a plurality of amplifier circuits; a plurality of antennas adapted to have different main transmit directions; and a transformation unit including a plurality of inputs connected to the plurality of amplifier circuits and a plurality of outputs connected to the plurality of antennas, wherein the transformation unit is configured to transform a plurality of amplified transmit signals present at the plurality of inputs into a combined power transmit signal and to provide the combined power transmit signal at one of the plurality of outputs; wherein the transformation unit is configured to transform the plurality of amplified transmit signals into the combined power transmit signal such that the one output at which the combined power transmit signal is provided is defined by amplitudes and/or phases of the plurality of amplified transmit signals; and wherein the plurality of amplifier circuits are configured to amplify a transmit signal with controllable gains and/or controllable phase shifts in order to obtain the plurality of amplified transmit signals, wherein the transmitter is configured to control the gains and/or phase shifts such that the plurality of amplifier circuits provide the plurality of amplified transmit signals with predefined amplitudes and/or phases, wherein the transformation unit is configured to provide the combined power transmit signal at the one output defined by the amplitudes and/or phases of the plurality of amplified transmit signals.

According to another embodiment, a transceiver may have: an inventive transmitter; and a receive path, wherein the receive path includes an output; and a plurality of receive path amplifiers connected in series between the output and the plurality of antennas, wherein the plurality of antennas are adapted to have different main receive directions in order to receive a plurality of receive signals from the different main receive directions.

According to another embodiment, a system may have: a first and a second inventive transceiver; wherein the first transceiver is configured to transmit a transmit signal including a spreading code subsequently with each antenna of the plurality of its antennas in order to establish a connection between the first and second transceiver; and wherein the second transceiver is configured to receive simultaneously a plurality of receive signals with the plurality of its antennas, to derive a direction from which the transmit signal is received based on the plurality of receive signals, and to select the antenna of the plurality of antennas having the main receive directions that corresponds to the direction from which the transmit signal is received, in order to establish the connection between the first and second transceiver.

According to another embodiment, a method for operating a transmitter, wherein the transmitter includes a plurality of amplifier circuits, a plurality of antennas adapted to have different main transmit directions, and a transformation unit including a plurality of inputs connected to the plurality of amplifier circuits and a plurality of outputs connected to the plurality of antennas, may have the steps of: amplifying a transmit signal with controllable gains and/or controllable phase shifts in order to obtain the plurality of amplified transmit signals; controlling the gains and/or phase shifts such that the plurality of amplifier circuits provide the plurality of amplified transmit signals with predefined amplitudes and/or phases; transforming the plurality of amplified transmit signals present at the plurality of inputs of the transformation unit into a combined power transmit signal; and providing the combined power transmit signal at one of the plurality of outputs of the transformation unit; wherein transforming the plurality of transmit signals includes transforming the plurality of amplified transmit signals into the combined power transmit signal such that the one output at which the combined power transmit signal is provided is defined by amplitudes and/or phases of the plurality of amplified transmit signals; and wherein providing the combined power transmit signal includes providing the combined power transmit signal at the one output defined by the amplitudes and/or phases of the plurality of amplified transmit signals.

Another embodiment may have a computer program having a program code for performing, when running on a computer or microprocessor, an inventive method.

Embodiments of the present invention provide a transmitter comprising a plurality of amplifier circuits, a plurality of antennas adapted to have different main transmit directions and a transformation unit. The transformation unit comprises a plurality of inputs connected to the plurality of amplifier circuits and a plurality of outputs connected to the plurality of antennas. The transformation unit is configured to transform a plurality of amplified transmit signals present at the plurality of inputs into a combined power transmit signal and to provide the combined power transmit signal at one of the plurality of outputs.

According to the concept of the present invention, a parallel amplification of the transmit signal is achieved by means of the plurality of amplifier circuits, wherein a low loss bundling of the plurality of amplified transmit signals is performed by the transformation unit that is configured to transform the plurality of amplified transmit signals into the combined power transmit signal. Moreover, the transformation unit is configured to provide the combined power transmit signal at one of the plurality of outputs for the antenna connected to the one output. Thus, the combined power transmit signal is radiated by the antenna in the main transmit direction of the antenna.

In some embodiments of the present invention the transformation unit can be configured to transform the plurality of amplified transmit signals into the combined power transmit signal such that the one output at which the combined power transmit signal is provided is defined by amplitudes and/or phases of the plurality of amplified transmit signals.

Moreover, in some embodiments of the present invention the transformation unit can be configured to transform the plurality of amplified transmit power (or signals) into the combined power transmit signal by means of an orthogonal transformation or a discrete Fourier transformation.

Furthermore, in some embodiments of the present invention the transformation unit can be a high frequency lens, a Rotman lens or a Butler matrix.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
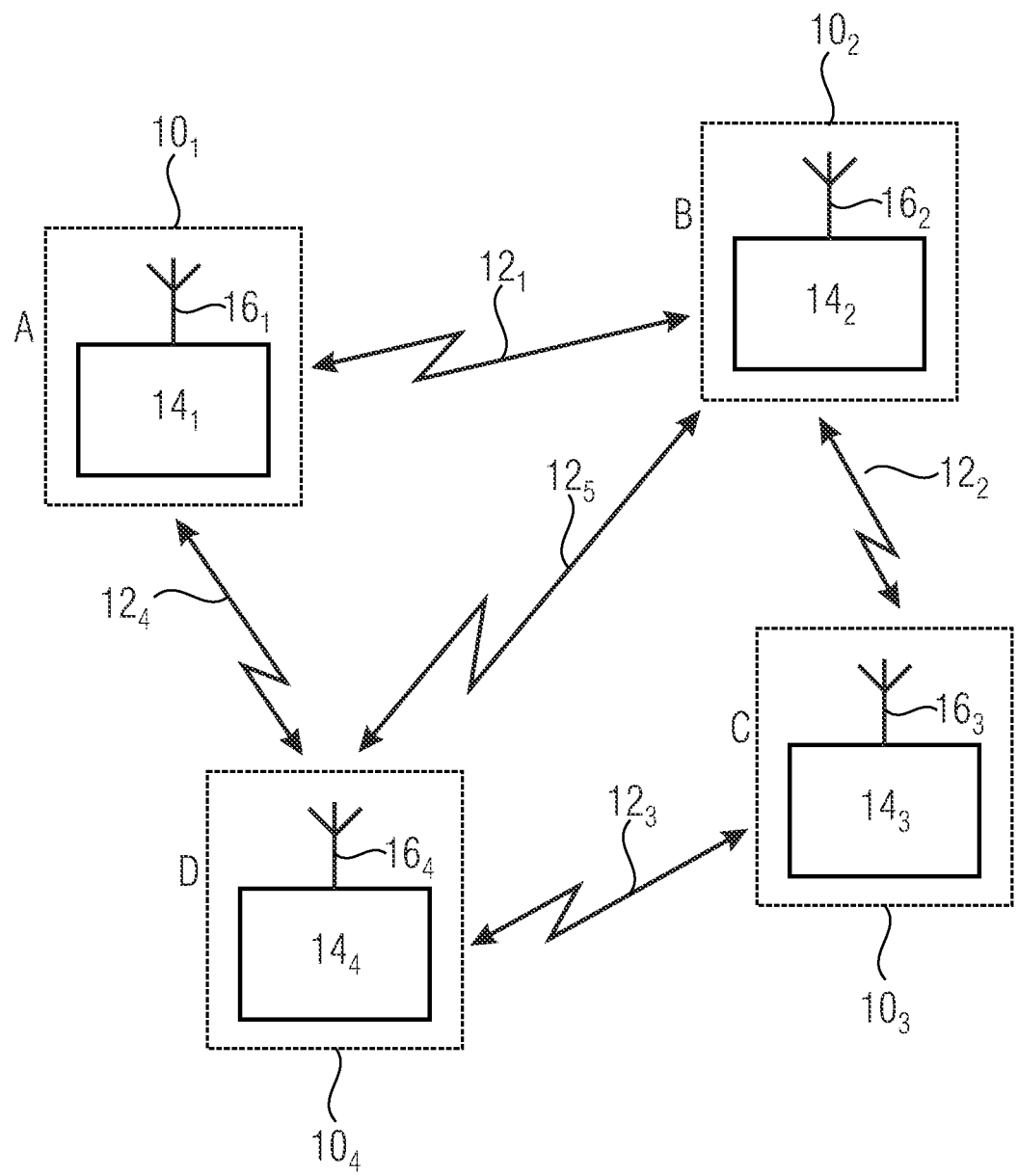
FIG. 1 shows a block diagram of a plurality of radio stations that are communicating to each other by means of high frequency signals.
Figure 2:
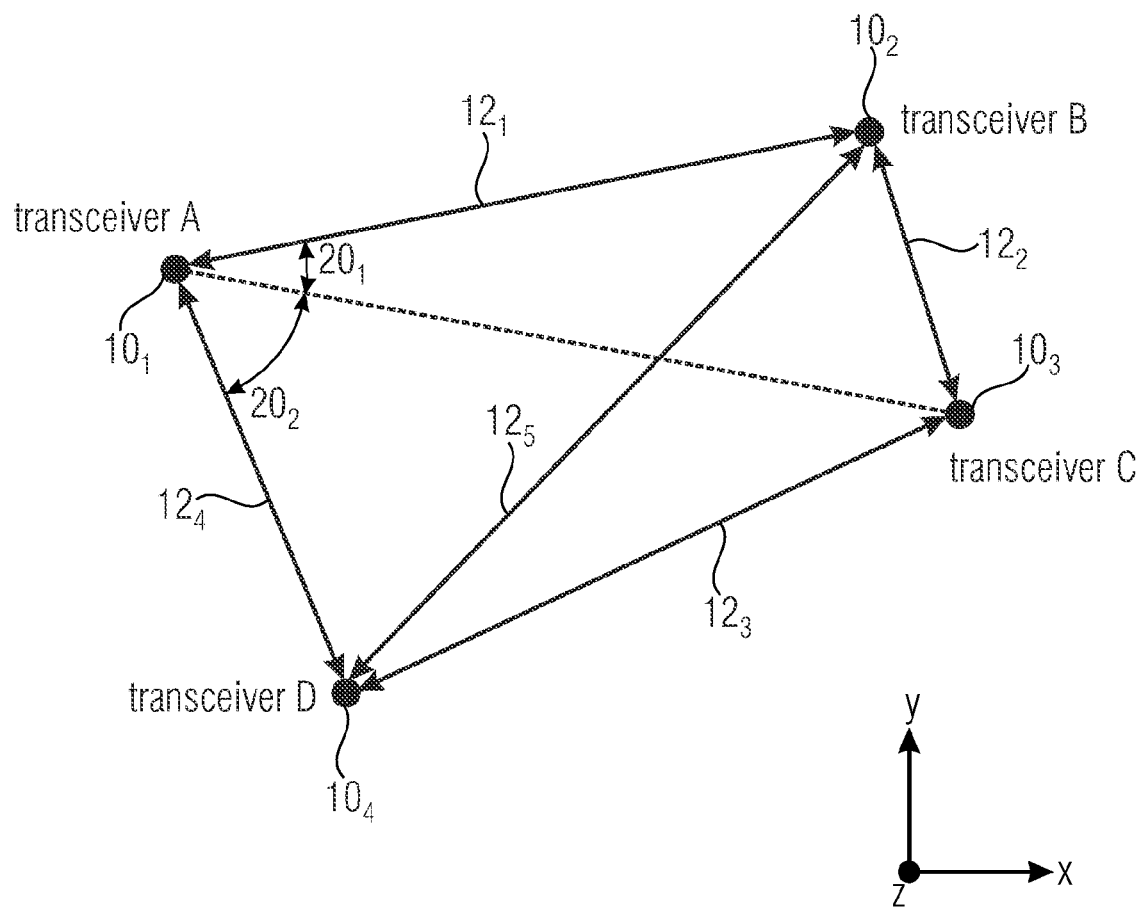
FIG. 2 shows a block diagram of a meshed network formed by the plurality of radio stations shown in FIG. 1.
Figure 3:
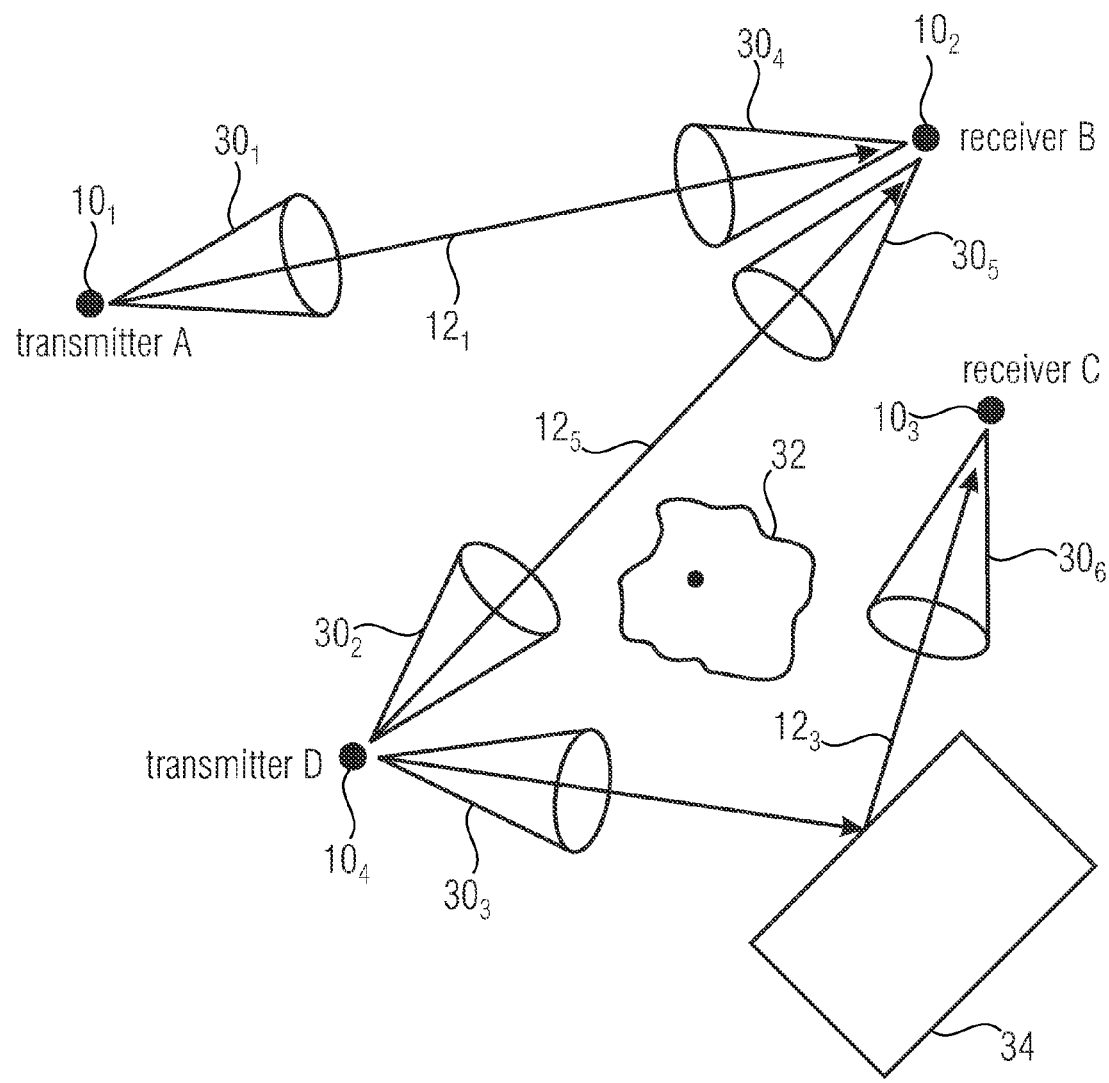
FIG. 3 shows a block diagram of the radio stations shown in FIG. 1, wherein two of the radio stations are configured as transmitters and the other two as receivers.

Equal or equivalent elements or elements with equal or equivalent functionality are denoted in the following description by equal or equivalent reference numerals.

In the following description, a plurality of details are set forth to provide a more thorough explanation of embodiments of the present invention. However, it will be apparent to one skilled in the art that embodiments of the preset invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

Figure 4:
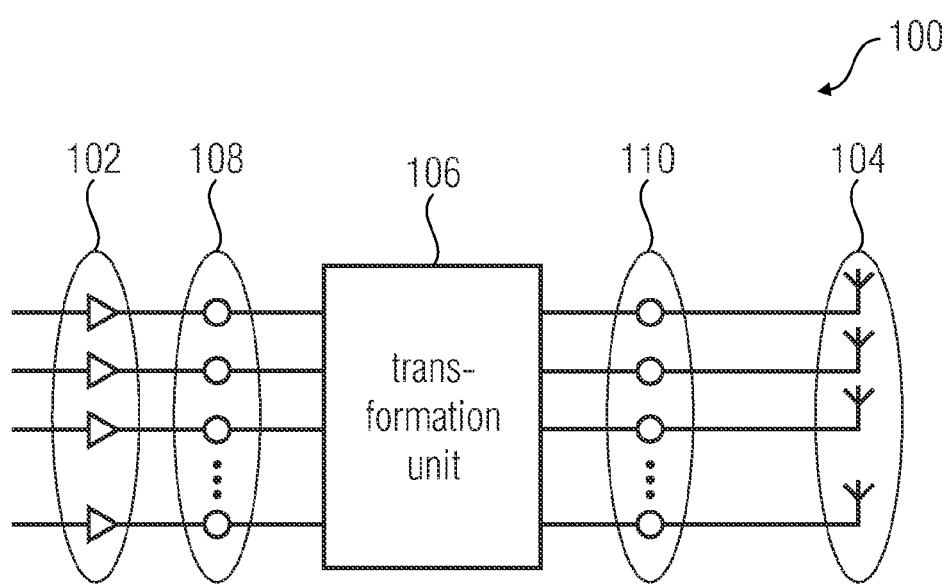
FIG. 4 shows a block diagram of a transmitter according to an embodiment of the present invention.

FIG. 4 shows a block diagram of a transmitter 100 according to an embodiment of the present invention. The transmitter 100 comprises a plurality of amplifier circuits 102, a plurality of antennas 104 adapted to have different main transmit directions and a transformation unit 106. The transformation unit 106 comprises a plurality of inputs 108 connected to the plurality of amplifier circuits 102 and a plurality of outputs 110 connected to the plurality of antennas 104. The transformation unit 106 is configured to transform a plurality of amplified transmit signals present at the plurality of inputs 108 into a combined power transmit signal and to provide the combined power transmit signal at one of the plurality of outputs 110.

According to the concept of the present invention, a parallel amplification of the transmit signal is achieved by means of the plurality of amplifier circuits 102 (e.g. a plurality of amplifiers), wherein a low loss bundling of the plurality of amplified transmit signals is performed by the transformation unit 106 that is configured to transform the plurality of amplified transmit signals into the combined power transmit signal. Moreover, the transformation unit 106 is configured to provide the combined power transmit signal at one output of the plurality of outputs 110 for the antenna connected to the one output. Thus, the combined power transmit signal is radiated by the antenna in the main transmit direction of the antenna.

In embodiments, the transformation unit 106 can comprise M inputs 108 and N outputs, wherein M is a natural number greater than or equal to two or three (M≥3 or M≥2), and wherein N is a natural number greater than or equal to two or three (N≥3 or M≥2). Thereby, in some embodiments, the number of inputs M can be equal to the number of outputs N (M=N), wherein in other embodiments the number of inputs M can be unequal to the number of outputs N (M≠N). Since the plurality of amplifier circuits 102 are connected to the plurality of inputs 108 of the transformation unit 106, the number of amplifier circuits can be equal to the number of inputs M of the transformation unit 106.

In some embodiments, the transformation unit 106 can be configured to transform the plurality of amplified transmit signals into the combined power transmit signal by means of an orthogonal transformation or a discrete Fourier transformation.

Furthermore, in some embodiments, the transformation unit 106 can be a high frequency lens, a Rotman lens or a Butler matrix.

Moreover, in some embodiments, the transformation unit 106 can be configured to transform the plurality of amplified transmit signals into the combined power transmit signal such that the one output of the plurality of outputs at which the combined power transmit signal is provided is defined by amplitudes and/or phases of the plurality of amplified transmit signals.

Hence, by adjusting the amplitudes and/or phases of the plurality of amplified transmit signals that are present at the plurality of inputs 108 of the transformation unit 106, the one output of the plurality of outputs 110 at which the combined power transmit signal is provided can be selected. Thus, the combined power transmit signal can be radiated by the antenna connected to the one output in the main transmit direction of the antenna.

As already mentioned, the plurality of antennas 104 are adapted to have different main transmit directions. In some embodiments, the plurality of antennas 104 can be directional antennas arranged to have the different main transmit directions. The main transmit directions can be characterized by the main lobes or beams of the plurality of antennas 104. Furthermore, the main transmit directions of the plurality of antennas 104 can be described by azimuthal angles.

Figure 5:
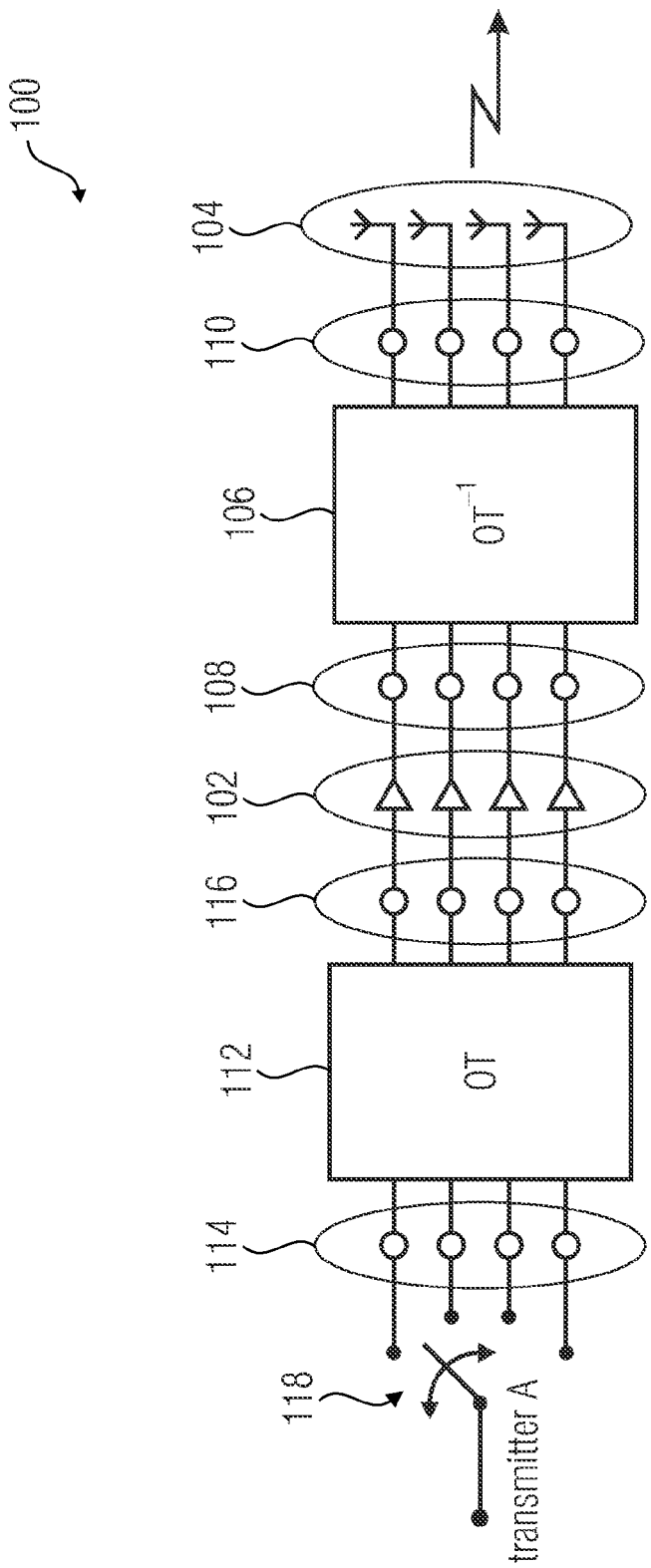
FIG. 5 shows a block diagram of a transmitter according to an embodiment of the present invention.

FIG. 5 shows a block diagram of a transmitter 100 according to an embodiment of the present invention. In contrast to FIG. 4, the transmitter 100 comprises a further transformation unit 112 comprising a plurality of inputs 114 and a plurality of outputs 116 connected to the plurality of amplifier circuits 102. The further transformation unit 112 can be configured to transform a transmit signal present at one of the plurality of inputs 114 into a plurality of phase shifted transmit signals such that the input of the plurality of inputs 114 at which the transmit signal is present defines the phases of the plurality of phase shifted transmit signals and to provide the plurality of phase shifted transmit signals at the plurality of outputs 116. The plurality of amplifier circuits 102 can be configured to amplify the plurality of phase shifted transmit signals in order to obtain the plurality of amplified transmit signals.

In some embodiments, the further transformation unit 112 can be configured to transform the transmit signal into the plurality of phase shifted transmit signals by means of an orthogonal transformation or a discrete Fourier transformation. Moreover, the further transformation unit 112 can be a high frequency lens, a Rotman lens or a Butler matrix.

Furthermore, in some embodiments, the transformation unit 106 can be configured to perform a transformation which is inverse to the transformation performed by the further transformation unit 112, such that the one input of the plurality of inputs 114 of the further transformation unit 112 at which the transmit signal is present defines the one output of the plurality of outputs 110 of the transformation unit 106 at which the combined power transmit signal is provided.

For example, the further transformation unit 112 can be configured to transform the transmit signal present at one of the plurality inputs 114 into the plurality of phase shifted transmit signals present at the plurality of outputs 116 by means of an orthogonal transformation (OT), wherein the transformation unit 106 can be configured to perform an inverse orthogonal transformation ($OT^{-1}$), which is inverse to the transformation performed by the further transformation unit 112.

As shown in FIG. 5, the transmitter 100 can comprise a switching element 118 comprising an input and a plurality of outputs connected to the plurality of inputs 114 of the further transformation unit 112. The switching element 118 (e.g. a switch or a change-over switch) can be configured to provide the transmit signal present at its input at one output of the plurality of its outputs. Hence, the switching element 118 can be used to select the one input of the plurality of inputs 114 of the further transformation unit 112 at which the transmit signal is provided, and thus the one output of the plurality of outputs 110 at which the combined power transmit signal is provided. The combined power transmit signal is radiated by the antenna connected to the one output in the main transmit direction of the antenna.

In the following, the transformation unit 106 and the further transformation unit 112 are denoted in the drawings with OT (orthogonal transformation unit) and $OT^{-1}$ (inverse orthogonal transformation unit) by way of example. Naturally, the transformation unit 106 and the further transformation unit 112 can be configured to perform any other transformations, including non-orthogonal transformations.

In some embodiments, the orthogonal transformation units OT and $OT^{-1}$ (106 and 112) are the central components that make the parallel amplification of the transmit signal possible. The transmit direction (or azimuthal angle) can be selected by means of the switching element 118 with which a particular antenna (or radiating element) of the plurality of antennas 104 and thus a particular transmit direction can be determined.

Figure 6:
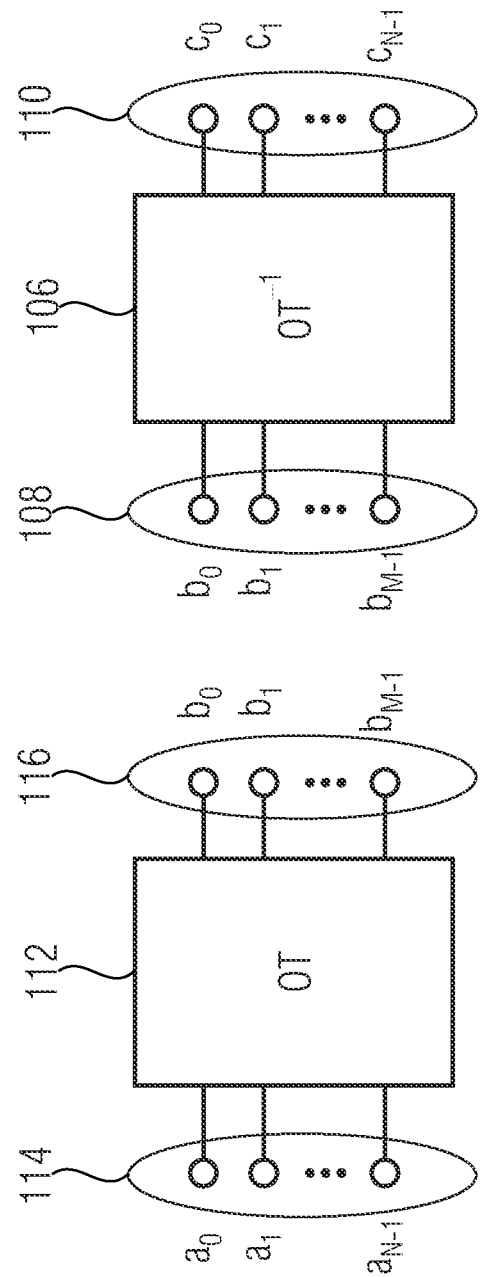
FIG. 6 shows a block diagram of the transformation unit and the further transformation unit according to an embodiment of the present invention.

FIG. 6 shows a block diagram of the transformation unit 106 and the further transformation unit 112 according to an embodiment of the present invention. The further transformation unit 112 can comprise N inputs 114 and M outputs 116, and be configured to perform an orthogonal transformation (or unitary mapping) of the input signals (present at the N inputs 114) to the output signals (present at the M outputs 116), wherein N and M are natural numbers greater than or equal to two or three (N≥3 or N≥2; M≥3 or M≥2). In FIG. 6, the input signals present at the N inputs 114 are denoted with $a_0(t)$ to $a_{N-1}(t)$, wherein the output signals present at the M outputs 116 are denoted with $b_0(t)$ to $b_{M-1}(t)$. The input and output signals can be mathematically described as vectors:

$$a=(a_0, a_1, \ldots, a_{N-1})$$

$$b=(b_0, b_1, \ldots, b_{M-1}) \quad (1)$$

Due to the (orthogonal) transformation performed by the further transformation unit 112, the input signals $a_0(t)$ to $a_{N-1}(t)$ and output signals $b_0(t)$ to $b_{M-1}(t)$ are directly related to each other:

$$b=OT(a) \quad (2)$$

Thereby, OT describes the mapping function (or representation function) of the further transformation unit 112.

As already mentioned, the transformation unit 106 can be configured to perform a transformation which is inverse to the transformation performed by the further transformation unit 112. In other words, the transformation unit 106 is an inverse transformation unit.

The transformation unit 106 can comprise M inputs 108 and N outputs 110, and be configured to perform an inverse orthogonal transformation (or unitary mapping) of the input signals (present at the M inputs 108) to the output signals (present at the N outputs 110). The input signals present at the M inputs 108 are denoted with $b_0(t)$ to $b_{M-1}(t)$, wherein the output signals present at the M outputs 116 are denoted with $c_0(t)$ to $c_{N-1}(t)$. The output signal can be mathematically described as vector:

$$c=(c_0, c_1, \ldots, c_{N-1}) \quad (3)$$

Due to the (inverse orthogonal) transformation performed by the transformation unit 106, the input signals $b_0(t)$ to $b_{M-1}(t)$ and output signals $c_0(t)$ to $c_{N-1}(t)$ are directly related to each other:

$$c=OT^{-1}(b) \quad (4)$$

If the plurality of inputs 108 of the transformation unit 106 are connected to the plurality of outputs 116 of the further transformation 112 unit, then it follows:

$$c=OT^{-1}(OT(a))=a \quad (5)$$

This means that the output signals $c_0(t)$ to $c_{N-1}(t)$ of a cascaded (normal) transformation unit (OT) and inverse transformation unit ($OT^{-1}$) are equivalent to the input signals $a_0(t)$ to $a_{N-1}(t)$.

The discrete Fourier transformation (DFT) is an orthogonal transformation that fulfills these requirements for a particular class of input signals and that can be implemented in components (or devices) such as in high frequency lenses. The necessitated properties of the input signals are described below.

In the following, for simplicity it is assumed that the number of inputs are equal to the number of outputs (N=M), nevertheless this is not a necessitated requirement. In addition, it is assumed that the discrete Fourier transformation is used as transformation function, nevertheless this is as well not a necessitated requirement.

Figure 7:
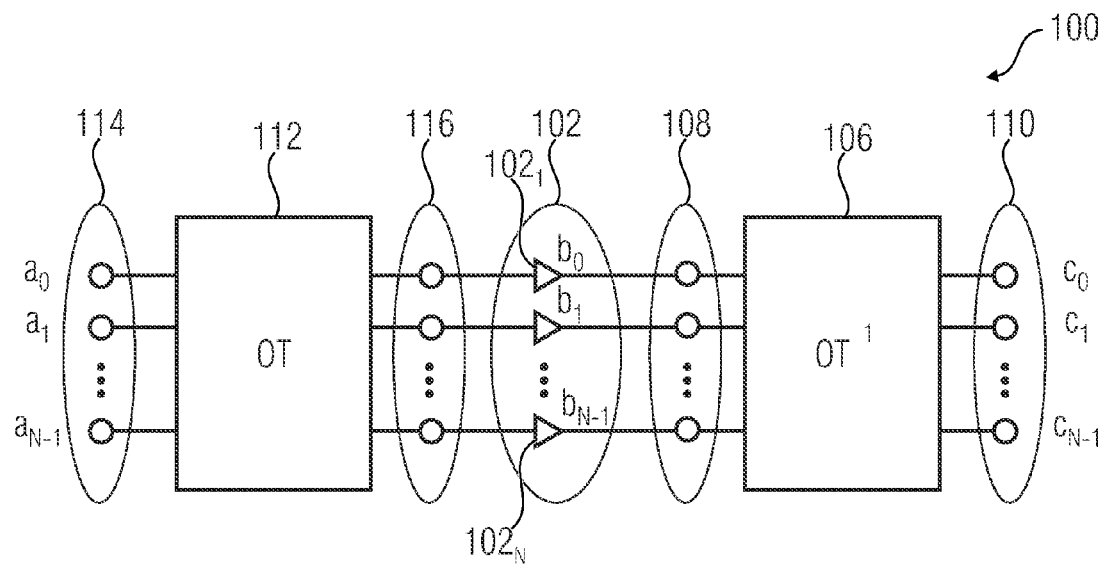
FIG. 7 shows a block diagram of a transmitter according to an embodiment of the present invention.

FIG. 7 shows a transmitter 100 according to an embodiment of the present invention. As shown in FIG. 7, the plurality of (parallel) amplifier circuits 102 are placed (or connected in series) between the plurality of outputs 116 of the further transformation unit 112 (OT) and the plurality of inputs 108 of the transformation unit 106 ($OT^{-1}$).

The input signal is applied to the plurality of inputs 114 of the further transformation unit 112. The plurality of outputs 116 of the further transformation unit 112 are connected to the plurality of amplifier circuits 102 which in turn are connected to the plurality of inputs 108 of the transformation unit 106. The transformation unit 106 forms the inverse of the further transformation unit 112 (in the case of the discrete Fourier transformation, both transformation functions (OT and $OT^{-1}$) may be approximately similar except for an amplitude factor). The plurality of outputs 110 of the transformation unit 106 (form the N output gates and) can be connected to the plurality of transmit antennas 104.

If the input signal is applied to one (arbitrary) input $a_i$ (i=0, 1, ..., N−1) of the plurality of inputs 114 of the further transformation unit 112 and if the further transformation unit 112 is configured to perform a discrete Fourier transformation, then the signal power (of the input signal) is distributed uniformly at the plurality of outputs 116 of the further transformation unit 112 (i.e. same absolute values). The signal power is then amplified in parallel by the plurality of amplifier circuits 102 and concentrated at one output of the plurality of outputs 110 (the (mirrored) output of the plurality of outputs 110 that corresponds to the input of the plurality of inputs 114) by the transformation unit 106. If the component losses are neglected and if an amplification factor (gain) of K is assumed, then the output signal at the selected output 110 of the transformation unit 106 can be calculated to:

$$c = OT^{-1}(K \cdot OT(a)) = OT^{-1}(K \cdot b) = NK \cdot a \qquad (6)$$

In other words, the further transformation unit 112 can be configured to transform the transmit signal present at one input (e.g. a selected input) of the plurality of inputs 114 into the plurality of phase shifted transmit signals and to provide the plurality of phase shifted transmit signals at the plurality of outputs 116. The plurality of amplifier circuits 102 can be configured to amplify the plurality of phase shifted transmit signals in order to obtain the plurality of amplified transmit signals. The transformation unit 106 can be configured to transform the plurality of amplified transmit signals present at the plurality of inputs 108 into the combined power transmit signal and to provide the combined power transmit signal at the one output (e.g. the selected output corresponding (or equivalent) to the selected input) of the plurality of outputs 110 defined by the amplitudes and/or phases of the plurality of amplified transmit signals. In some embodiments, the transmit signal can be one of the input signals $a_0(t)$ to $a_{N-1}(t)$ of the further transformation unit 112, wherein the plurality of phase shifted transmit signals can be the output signals of the further transformation unit 112. Moreover, the plurality of amplified transmit signals can be the inputs signals of the transformation unit 106, wherein the combined power transmit signal can be one of the output signals $c_0(t)$ to $c_{N-1}(t)$ of the transformation unit 106.

In some embodiments, the first transformation unit 112 may not be implemented as a dedicated device (or component). It is also possible to generate the transformation, which is performed in the above embodiments by the further transformation unit 112, in an arbitrary way and to drive the individual inputs of the plurality of amplifier circuits 102 with the so-generated signals. In that case, the output vector is the transform of the input vector, amplified by the factor NK. In some hardware implementations, signals having the same absolute values may be applied to the inputs of the plurality of amplifier circuits 102.

Figure 8:
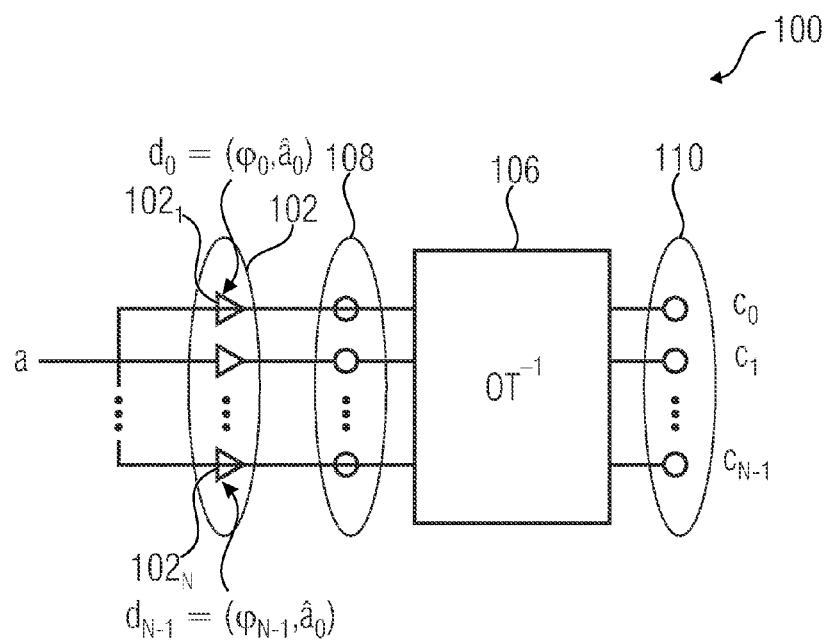
FIG. 8 shows a block diagram of a transmitter according to an embodiment of the present invention.

FIG. 8 shows a block diagram of a transmitter 100 according to an embodiment of the present invention. The transmitter 100 comprises the plurality of amplifier circuits 102 and the transformation unit 106. The plurality of amplifier circuits 102 can be configured to amplify a transmit signal with controllable gains and/or controllable phase shifts in order to obtain the plurality of amplified transmit signals. The transmitter 100 can be configured to control the gains and/or phase shifts such that the plurality of amplifier circuits 102 provide the plurality of amplified transmit signals with predefined amplitudes and/or phases. The transformation unit 106 can be configured to provide the combined power transmit signal at the one output of the plurality of outputs 110 defined by the amplitudes and/or phases of the plurality of amplified transmit signals.

In some embodiments, the term "predefined" may refer to a given, calculated, controlled, adapted, set and/or defined value, e.g. phase or amplitude, that can be calculated, controlled, adapted, configured, set and/or defined at runtime or prior to runtime of the transmitter 100.

In other words, an input signal a(t) can be applied (simultaneously) to the N inputs of amplifiers 102. The amplifiers 102 can be configured to alter individually the phase relationship and/or phase shift $\phi_i$ and the amplification factor (gain) $\hat{a}_i$ of the input signals a(t). When using the discrete Fourier transformation, these pairs of values ($\phi_i$, $\hat{a}_i$) can be adjusted (or determined) such that the individual output signals cj are arbitrary amplitude shifted and/or phase shifted versions of the input signal a(t). Furthermore, these pairs of values ($\phi_i$, $\hat{a}_i$) can be referred to as complex input coefficients $d_i$. When using a properly built high frequency lens or Butler matrix these pairs of values ($\phi_i$, $\hat{a}_i$) can be calculated directly by means of the discrete Fourier transformation for arbitrary distributions of the output signals.

Let $c = (c_0, c_1, \ldots, c_{N-1})$ be the desired distribution of the signals at the plurality of outputs 110. The complex input coefficients can be calculated to:

$$d_i = \sum_{l=0}^{N-1} e^{-2\pi j \frac{li}{N}} \cdot c_l \qquad (7)$$

Especially the coefficients that lead to a concentration of the signal energy at one specific output $c_j$ are of interest for the desired change-over switch functionality:

$$c_k = 0 \, \forall k \ne j \text{ with } j \in \{0, 1, \ldots, N-1\} \qquad (8)$$

If the discrete Fourier transformation is used and if the above requirements are taken into account, then all amplification factors (gains) may be equal:

$$\hat{a}_i = K \qquad (9)$$

In other words, it may be enough to set at the individual amplifiers the relative phase relationships of the signals. Therewith it follows:

$$c_j = N \cdot K \cdot a(t) \qquad (10)$$

This means that the parallel amplified input signal a(t) is present at one output cj of the plurality of outputs 110.

Hence, the parallel amplified signal can be switched over between the outputs 110 of the transformation unit 106 by proper adjusting the phase relationships (or phase shifts) at the amplifiers 102 (or the phase relationship between the input signals and the amplifiers 102).

As already mentioned, in some embodiments, the transformation unit 106 can be a high frequency lens. In the following, the construction of such a high frequency lens is mathematically derived by way of example.

The input signals (present at the plurality of inputs 114) of the inverse transformation unit 106 can be defined as:

$$S_n(t) = A_n f(t - t_n) \qquad (11)$$

Thereby, f(t) is a common (or mutual) time domain function. Moreover, it is assumed that f(t) is a stationary complex function comprising the form $f(t) = b e^{j\omega t}$, wherein b denotes the (complex) amplitude of the signal, and wherein $\omega = 2\pi f_0$ denotes the frequency of the signal.

The amplitude shifted, and phase or time shifted input signal $s_n(t)$ thus can be calculated to:

$$s_n(t) = A_n f(t-t_n) = A_n b e^{j\omega(t-t_n)} = A_n b e^{j\omega t_n} e^{j\omega t} = f(t) e^{j\omega t_n} \quad (12)$$

The path length (or line length) between an input and an output are denoted with $r_{n,m}$. Thereby, the output signal is delayed by $t_{n,m} = r_{n,m}/c_1$ with respect to the input signal due to the corresponding propagation delay (when a change in amplitude is neglected), wherein $c_1 = c_0/\sqrt{\epsilon_r \mu_r}$ is the propagation velocity within the high frequency lens. Thus, the output signal present at one output m of the plurality of outputs 110 can be calculated to:

$$s_m(t) = \sum_n S_n(t-t_{n,m}) = \sum_n A_n f(t-t_{n,m}-t_n) = \sum S_n(t) e^{j\omega t_{n,m}} \quad (13)$$

Moreover, the inverse discrete Fourier transformation can be calculated to:

$$h(n) = \frac{1}{M} \sum_{m=0}^{M-1} H(m) e^{\frac{2\pi j}{M} nm} \quad (14)$$

A comparison shows that the transformation function of a high frequency lens can be constructed such that the mapping (or transformation) corresponds to a discrete Fourier transformation of a time discrete signal when the above described requirements are taken into account. If the amplitude is neglected, then it follows:

$$e^{\frac{2\pi j}{M} nm} = \left( e^{j\omega t_{n,m}} = e^{2\pi j f_0 \frac{r_{n,m}}{c_1}} \right) = e^{2\pi j \frac{r_{n,m}}{\lambda_1}} \quad (15)$$

Thereby, $\lambda_1$ is the wavelength within the high frequency lens. Thus, the path length (or line length) within the high frequency lens can be calculated to:

$$r_{n,m} = \frac{\lambda_1}{M} nm + 2\pi k \quad (16)$$

Thereby, k is a natural number. Since the absolute phase relationship may be irrelevant for the targeted application, in some embodiments, an additional and for all path lengths (or line lengths) equal length $r_0$ can be allowed:

$$r_{n,m} = \frac{\lambda_1}{M} nm + 2\pi k + r_0 \quad (17)$$

The above restriction of the input signal of the high frequency lens to signals having the form $f(t) = b e^{j\omega t}$ can be extended to signals having the form $f'(t) = \Sigma_k b_k e^{j\omega_k t}$ without restricting the further derivation. Nevertheless, in that case, the consistency (or conformity) between the mapping function of the high frequency lens and the discrete Fourier transformation can be restricted since the phase shifts caused by the signal runtimes within the lens are frequency dependent (variable c in the above derivation).

In that case, the shape of the high frequency lens can be chosen such that an error of the mapping function is reduced for a given frequency range. In addition, the high frequency lens can be filled with a dispersive medium that compensates phase differences and/or runtime differences between different frequencies such that the error of the mapping function can be reduced (or even minimized) for a larger frequency range.

The above mathematical derivation describes the requirements that the high frequency lens may fulfill in order to perform the inverse discrete Fourier transformation. However, embodiments of the present invention also necessitate the inverse of the inverse transformation, i.e. the actual transformation. If the discrete Fourier transformation is used, then the actual transformation can be provided by exchanging the inputs and outputs. This relationship can be easily described by means of the matrix of the discrete Fourier transformation which describes the sum as a matrix and the data to be transformed as a vector. The result of a multiplication of the matrix with the data vector yields exactly to the discrete Fourier transformation.

The exchanging rules are very simple. The first row remains unchanged. The remaining rows of the matrix of the discrete Fourier transformation (1, 2, . . . , N) have to be reversed in sequence (N, . . . , 2, 1). Alternatively, it is also possible to rename the inputs and outputs, respectively.

In the following, different embodiments of the transmitter 100 and the corresponding signal processing are described. Moreover, in the following embodiments, the formation of a single beam by bundling the signal energy at a single output of the plurality of outputs 110 of the transformation unit 106 is considered by way of example. Nevertheless, further distributions of the signal energy at the plurality of outputs 110 can be achieved, for example, by varying the gains and/or phase shifts of the plurality of amplifier circuits 102.

Figure 9:
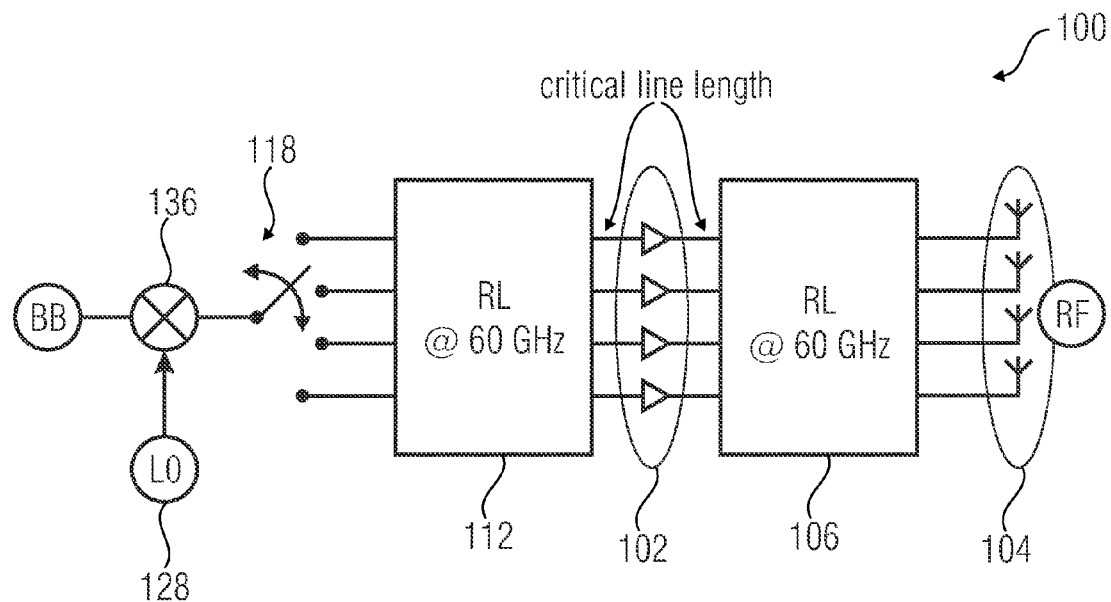
FIG. 9 shows a block diagram of a transmitter according to an embodiment of the present invention.

FIG. 9 shows a transmitter 100 according to an embodiment of the present invention. The transmitter 100 can comprise the plurality of amplifier circuits 102, the plurality of antennas 104 adapted to have different main transmit directions, the transformation unit 106 and the further transformation unit 112 as already described in detail above. In addition, the transmitter can comprises a local oscillator 128 configured to provide a local oscillator signal, a switching element 118 comprising an input and a plurality of outputs, and a mixer 136. The mixer 136 can be configured to mix a baseband or intermediate frequency transmit signal with the local oscillator signal in order to provide the transmit signal. The switching element 118 (e.g. a switch or a change-over switch) can be configured to provide the transmit signal present at its input at a selected output of its plurality of outputs, wherein the plurality of outputs of the switching element 118 can be connected to the plurality of inputs 114 of the further transformation unit 112.

As shown in FIG. 9, the transformation unit 106 and the further transformation unit 112 can be Rotman lenses (RL), e.g. operated at a frequency of 60 GHz (or at frequency in the range between 30 GHz to 100 GHz, 10 GHz to 500 GHz, or 1 GHz to 1000 GHz). The phase shifts can be generated by the further transformation unit 112 (RL), wherein the power can be combined by the transformation unit 106 (RL). Thereby, the functionality of the transmitter 100 corresponds to the above description and/or mathematical derivation.

The output of the plurality of outputs 110 at which the combined power transmit signal is provided and thus the main transmit direction (or desired beam or main lobe) in which the combined power transmit signal is radiated can be controlled (or selected) by means of the switching element 118, e.g. a mechanic or electronic switch operated at a frequency of 60 GHz (or at frequency in the range between 30 GHz to 100 GHz, 10 GHz to 500 GHz, or 1 GHz to 1000 GHz) on the input side. In contrast to state of the art solutions, the insertion losses of the switching element 118 are not caused within the power path downstream the amplifiers 102. Thus, the insertion losses of the switching element 118 are small compared to those state of the art solutions.

Note that different line lengths between the outputs 116 of the further transformation unit 112 (first Rotman lens) and the inputs of the transformation unit 106 (second Rotman lens) may result in an relative alternation of the phases of the signals present at the inputs 108 of the transformation unit 106. This could disturb the beam forming performed by the transformation unit 106 (second Rotman lens) and is denoted in the drawings with "critical line length". Thus, in some embodiments, the line lengths are equal.

Figure 10:
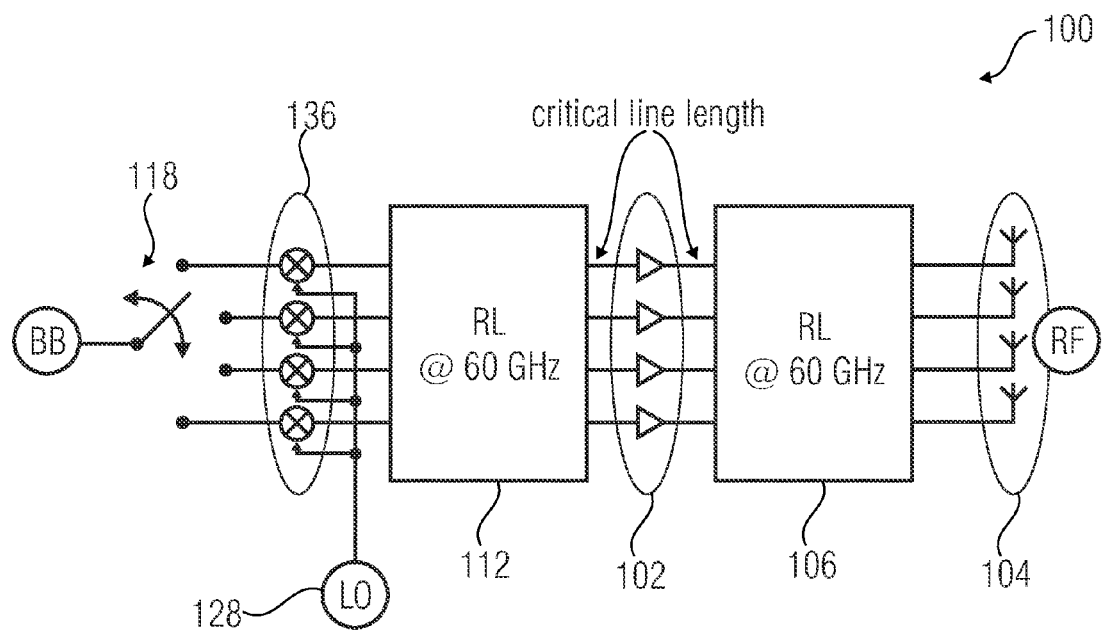
FIG. 10 shows a block diagram of a transmitter according to an embodiment of the present invention.

FIG. 10 shows a transmitter 100 according to an embodiment of the present invention. The transmitter 100 can comprise the plurality of amplifier circuits 102, the plurality of antennas 104 adapted to have different main transmit directions, the transformation unit 106 and the further transformation unit 112 as already described in detail above. In addition, the transmitter 100 can comprise a local oscillator 128 configured to provide a local oscillator signal, a switching element 118 comprising an input and a plurality of outputs, and a plurality of mixers 136. The plurality of mixers 136 can be connected in series between the plurality of outputs of the switching element 118 and the plurality of inputs 114 of the further transformation unit 112. The switching element 118 can be configured to provide a baseband or intermediate frequency transmit signal present at its input at a selected output of its plurality of outputs. Each mixer of the plurality of mixers 136 can be configured to mix the baseband or intermediate transmit signal present at the selected output of the plurality of outputs of the switching element 118 with the local oscillator signal in order to provide the transmit signal.

The embodiment of the transmitter 100 shown in FIG. 10 differs from the embodiment shown in FIG. 9 by the fact that the switching over is performed in the baseband or at the intermediate frequency. The subsequent up mixing to the high frequency carrier frequency is performed for each input of the further transformation unit 112 (first Rotman lens) with a separate mixer. In general, the switching over of the signals is easier to realize in the baseband (or at the intermediate frequency) than at the high frequency carrier frequency.

Figure 11:
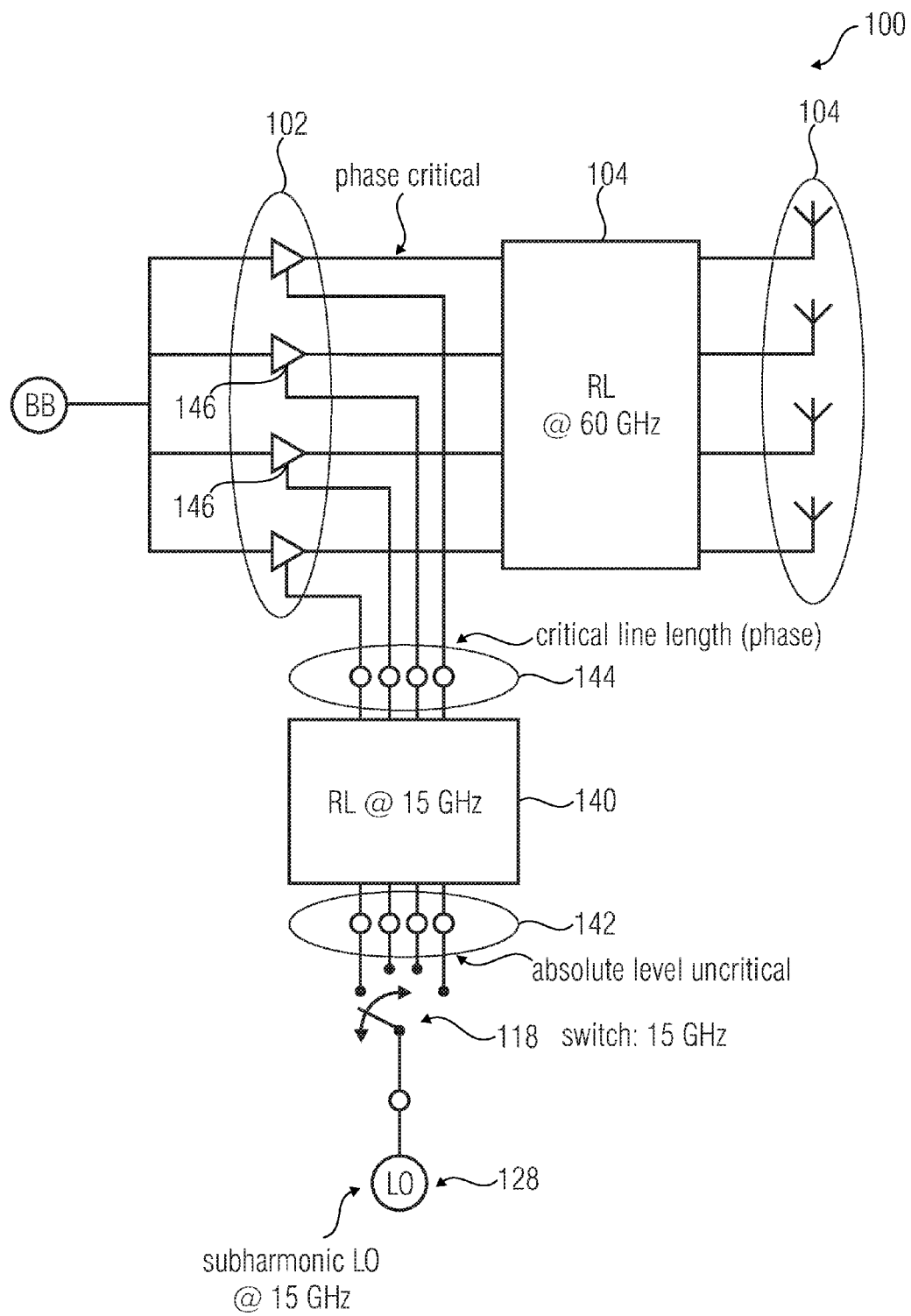
FIG. 11 shows a block diagram of a transmitter according to an embodiment of the present invention.

FIG. 11 shows a transmitter 100 according to an embodiment of the present invention. The transmitter can comprise the plurality of amplifier circuits 102, the plurality of antennas 104 adapted to have different main transmit directions, and the transformation unit 106 as already described in detail above. In addition, the transmitter 100 can comprise a local oscillator 128 configured to provide a local oscillator signal and a local oscillator transformation unit 140. The local oscillator transformation unit 140 can comprise a plurality of inputs 142 and a plurality of outputs 144. The local oscillator transformation unit 140 can be configured to transform the local oscillator signal present at one of the plurality of inputs 142 into a plurality of phase shifted local oscillator signals such that the input at which the local oscillator signal is present defines the phases of the plurality of phase shifted local oscillator signals and to provide the plurality of phase shifted local oscillator signals at the plurality of outputs 144. Furthermore, the plurality of amplifier circuits 102 can comprise control inputs 146 connected to the plurality of outputs 144 of the local oscillator transformation unit 140. The plurality of amplifier circuits 102 can be configured to obtain the plurality of amplified transmit signals based on mixing a baseband or an intermediate frequency transmit signal or amplified versions thereof with the plurality of phase shifted local oscillator signals present at the control inputs 146, thereby applying the phases of the plurality of phase shifted local oscillator signals to the plurality of amplified transmit signals.

In some embodiments, the local oscillator transformation unit 140 can be configured to transform the local oscillator signal into the plurality of phase shifted local oscillator signals by means of an orthogonal transformation or a discrete Fourier transformation. The local oscillator transformation unit 140 can be a high frequency lens, a Butler matrix, or as shown in FIG. 11 a Rotman lens.

In other words, another possibility to control the beam (or main lobe) is to generate the necessitated phase shifts at the frequency of the local oscillator. The so-generated local oscillator signals can be transformed by the local oscillator transformation unit 140 (or first Rotman lens) and afterwards mixed and amplified in parallel with the baseband transmit signal. The plurality of amplified transmit signals are then transformed by the transformation unit 106 (second Rotman lens) into the combined power transmit signal.

Figure 12:
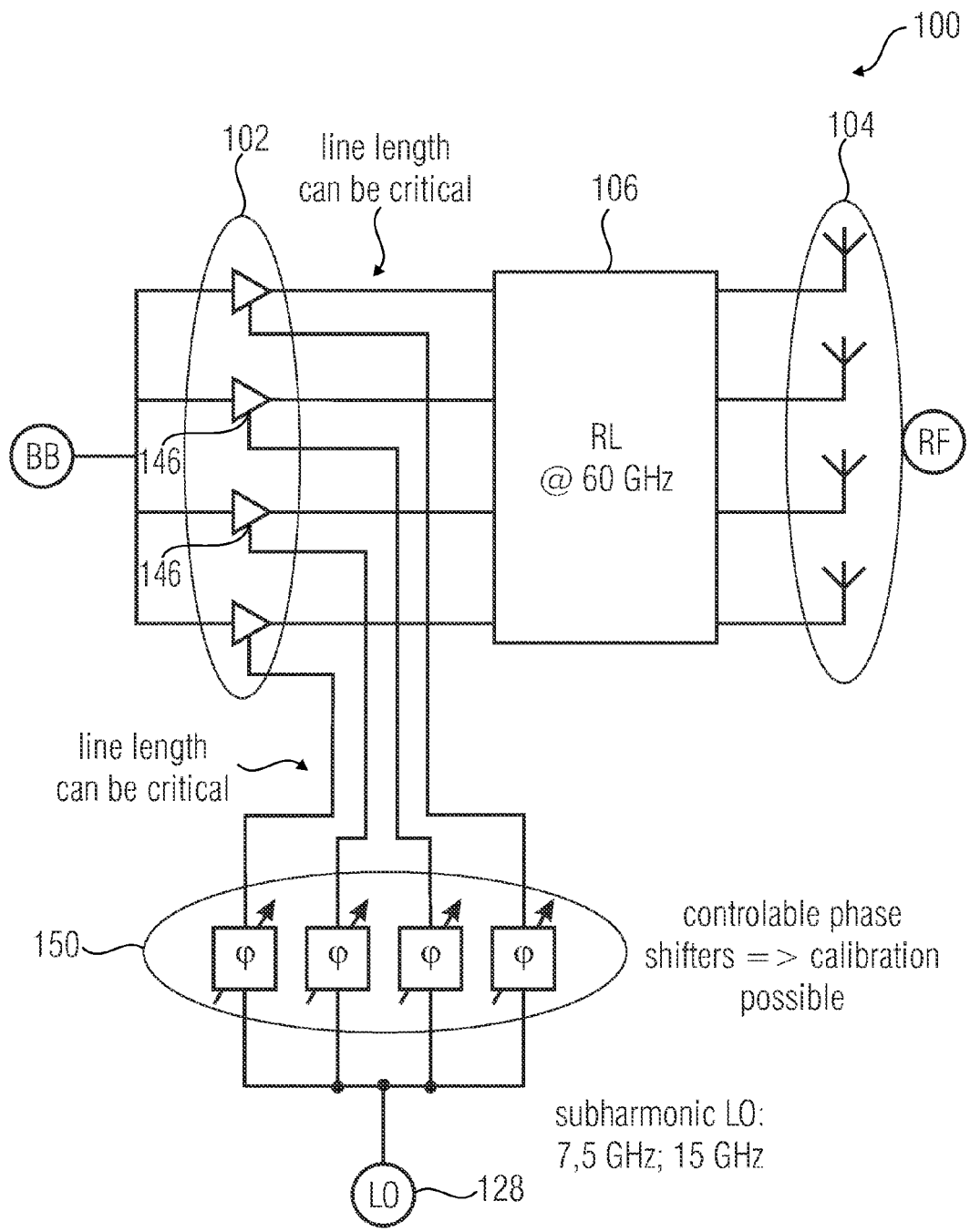
FIG. 12 shows a block diagram of a transmitter according to an embodiment of the present invention.

FIG. 12 shows a block diagram of a transmitter 100 according to an embodiment of the present invention. The transmitter 100 can comprise the plurality of amplifier circuits 102, the plurality of antennas 104 adapted to have different main transmit directions, and the transformation unit 106 as already described in detail above. In addition, the transmitter 100 can comprise a local oscillator 128 configured to provide a local oscillator signal and a plurality of controllable phase shifters 150. The plurality of controllable phase shifters can be connected to the local oscillator 128 and configured to provide a plurality of phase shifted local oscillator signals having predefined phases. Thereby, the plurality of amplifier circuits 102 can comprise control inputs 146 connected to the plurality of controllable phase shifters 150. The plurality of amplifier circuits 102 can be configured to obtain the plurality of amplified transmit signals based on mixing a baseband or intermediate frequency transmit signal or amplified versions thereof with the plurality of phase shifted local oscillator signals present at the control inputs 146, thereby applying the phases of the plurality of phase shifted local oscillator signals to the plurality of amplified transmit signals.

In other words, another possibility is to generate the necessitated phase shifts of the local oscillator signals by means of individually programmable phase shifters 150. Thus, different or varying line lengths can be compensated or calibrated out such that the layout of the transmitter 100 can be simplified.

Figure 13:
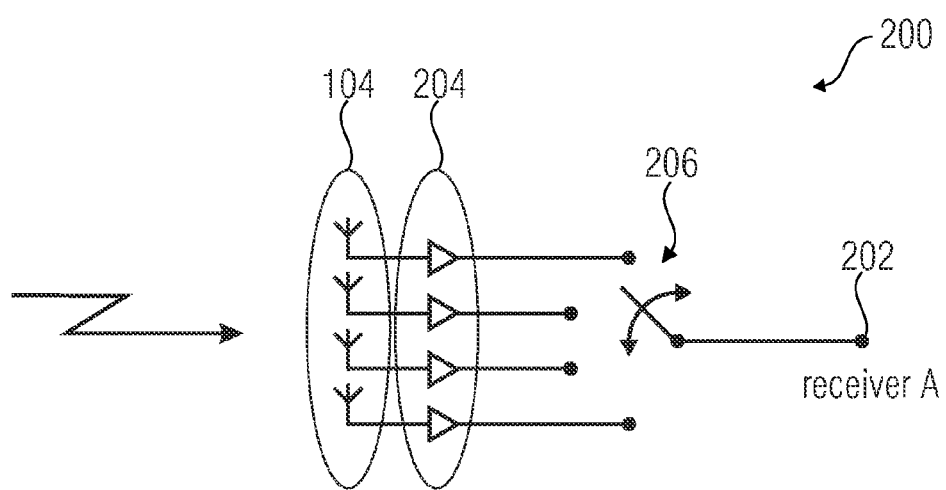
FIG. 13 shows a block diagram of a receive path according to an embodiment of the present invention.

FIG. 13 shows a block diagram of a receive path 200 of a transceiver according to an embodiment of the present invention. In some embodiments, the transceiver can comprise the transmitter 100 as described above and the receive path 200 shown in FIG. 13. The receive path 200 can comprise an output 202 and a plurality of receive path amplifiers 204 connected in series between the output 202 and the plurality of antennas 104. The plurality of antennas 104 can be adapted to have different main receive directions in order to receive a plurality of receive signals from the different main receive directions.

Note that in FIG. 13, four antennas 104 and four receive path amplifiers 204 are shown by way of example. In general, the receive path 200 can comprise N receive path amplifiers 204 connected to N antennas 104. In some embodiments, the number N of antennas and the number N of receive path amplifiers 204 can be equal to the number N of outputs of the transformation unit 106 of the transmitter 100.

In some embodiments, the plurality of receive path amplifiers 204 can be connected in series between the plurality of antennas 104 and the output 202 of the receive path 200 by means of a switching element 206 comprising an output and a plurality of inputs such that the plurality of inputs are connected to the plurality of receive path amplifiers 204 and the output to the output 202 of the receive path 200.

In other words, FIG. 13 shows the receive path (or receiver) 200 corresponding to the transmitter 100. The plurality of antennas 104 are connected to separate receive path amplifiers 204. The selection of one of the plurality of antennas 104 and thus of a receive direction can be performed by means of the switching element 206 (e.g. a switch or a change-over switch).

Figure 14:
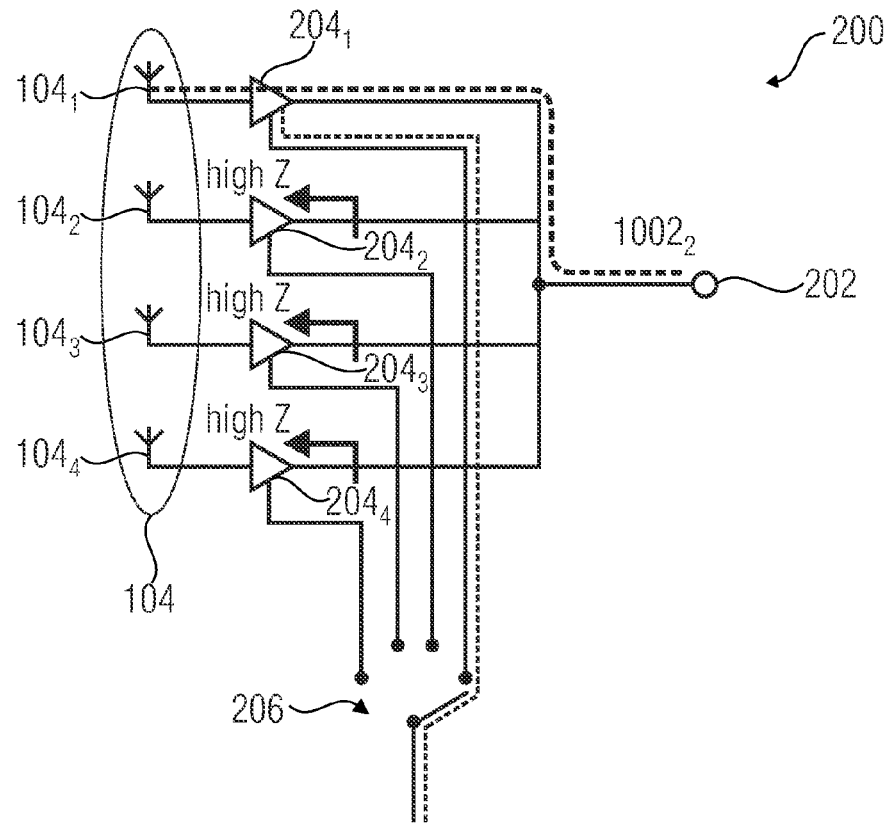
FIG. 14 shows a block diagram of a receive path according to an embodiment of the present invention.

FIG. 14 shows a block diagram of a receive path 200 according to an embodiment of the present invention. The receive path 200 can comprise an output 202 and a plurality of receive path amplifiers 204 connected in series between the output 202 and the plurality of antennas 104. The plurality of antennas 104 can be adapted to have different main receive directions in order to receive a plurality of receive signals from the different main receive directions.

In other words, the receive path 200 shown in FIG. 14 can be used for selecting the receive signal or the antenna receiving the receive signal. Each antenna of the plurality of antennas 104 can be connected to an amplifier 204, e.g. a low noise high frequency amplifier (LNA) 204, and to an optional mixer that can be configured to down mix the receive signal to an intermediate frequency or a baseband. The downstream signal processing of the receive path (e.g. analog-to-digital conversion, reconstruction of data) is thus performed only once for the combined signals present at the output 202 of the receive path 200. In contrast to this, MIMO receivers necessitate a parallel processing of all receive signals. As indicated in FIG. 14, the signal of the desired antenna (and hence remote station) can be received by activating (or selecting, or switching on) the corresponding amplifier.

Moreover, although beamforming receivers and beamforming transmitters may necessitate only a single signal processing unit when using a planar antenna array, there is the problem that when using a non-planar antenna array, averted antennas only increase the noise ratio.

Figure 15:
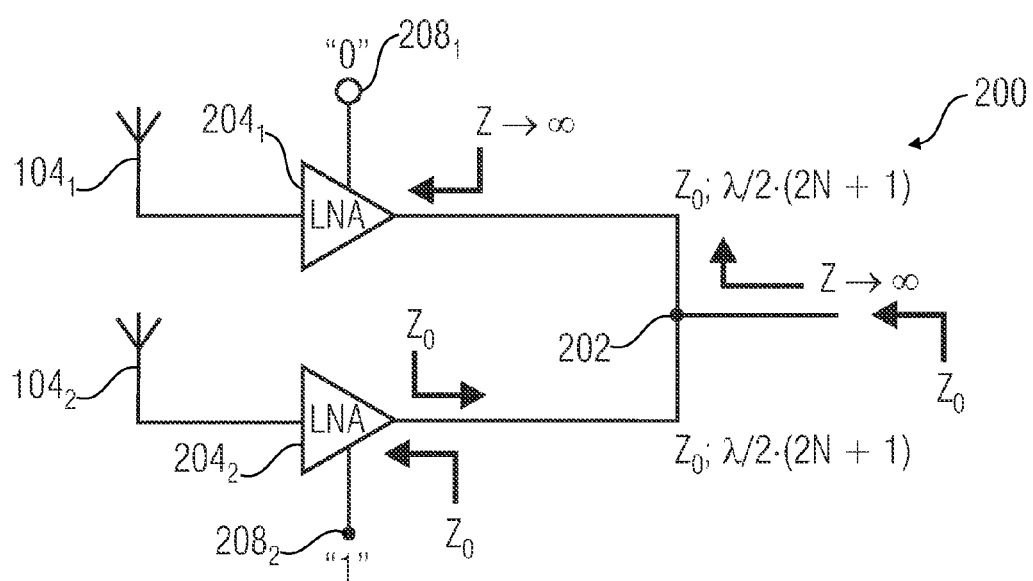
FIG. 15 shows a block diagram of a receive path according to an embodiment of the present invention.

FIG. 15 shows a block diagram of a receive path 200 according to an embodiment of the present invention. The plurality of receive path amplifiers 204 can be switchable between a switch on state and a switch off state in order to select one of the plurality of antennas for receiving the receive signal. The plurality of receive path amplifiers 204 can be configured to provide an output impedance that is in the switch on state adapted to a specific impedance of the receive path 200, and in the switch off state at least by a factor of 10 (or 20, 30, 40, 50, 100, 200, 300 or 1000 ) higher than the specific impedance of the receive path 200.

In some embodiments, the plurality of receive path amplifiers 204 can comprise inputs 208, e.g. control inputs or supply voltage inputs, and be adapted to switch over between the switch on state and the switch off state based on a signal, e.g. a control signal or supply voltage, present at the inputs 208.

Note that in FIG. 15, a first receive path amplifier $204_1$ (comprising a (control) input $208_1$) connected in series between a first antenna $104_1$ and the output 202, and a second receive path amplifier $204_2$ (comprising a (control) input $208_2$) connected in series between a second antenna $104_2$ and the output 202 are shown for illustration purposes.

Thereby, FIG. 15 shows the typical properties of the first and second receive path amplifiers $204_1$ and $204_2$. The first and second receive path amplifiers (e.g. low noise amplifiers) $204_1$ and $204_2$ can be switched on (or activated) or switched off (or deactivated) by means of a supply voltage or by any other means. Therefore, the receive path amplifiers $204_1$ and $204_2$ can comprise control inputs $208_1$ and $208_2$ (e.g. enable inputs). In FIG. 15, the first amplifier $204_1$ is shown in the switch-off state ("zero" present at the input $208_1$), wherein the second receive path amplifier $204_2$ is shown in the switch-on state ("one" present at the input $208_2$). The outputs of the first and second receive path amplifiers $204_1$ and $204_2$ can be connected by means of lines, e.g. transmission lines, having a specific impedance $Z_0$ and length $(2N+1)\lambda/2$ to the output 202. The first and second receive path amplifiers $204_1$ and $204_2$ can be adapted to have in the switch off state (or deactivated state) an output impedance that is at least by a factor of 10 higher (ideally infinite) than the specific impedance $Z_0$. In the switch on state (or active state) the output impedance corresponds to the specific line impedance $Z_0$. The high output impedance (ideally infinite output impedance) of the switched off receive path amplifier $204_1$ is mapped to the output 202 by means of the line connecting the first amplifier $204_1$ and the output 202. Thus, the impedance of the line connecting the switched on amplifier $204_2$ and the output 202 appears to be ideally matched to the specific impedance $Z_0$. Hence, no additional matching network may be necessitated even if a plurality of receive path amplifiers 204 are interconnected.

The common output 202 of the (low noise) receive path amplifiers 204 can thus be connected to a further signal processing unit (not shown). By switching on (or activating) a selected receive path amplifier 204 the signal present at the input of the selected (low noise) receive path amplifier can be switched to the common output 202.

Figure 16:
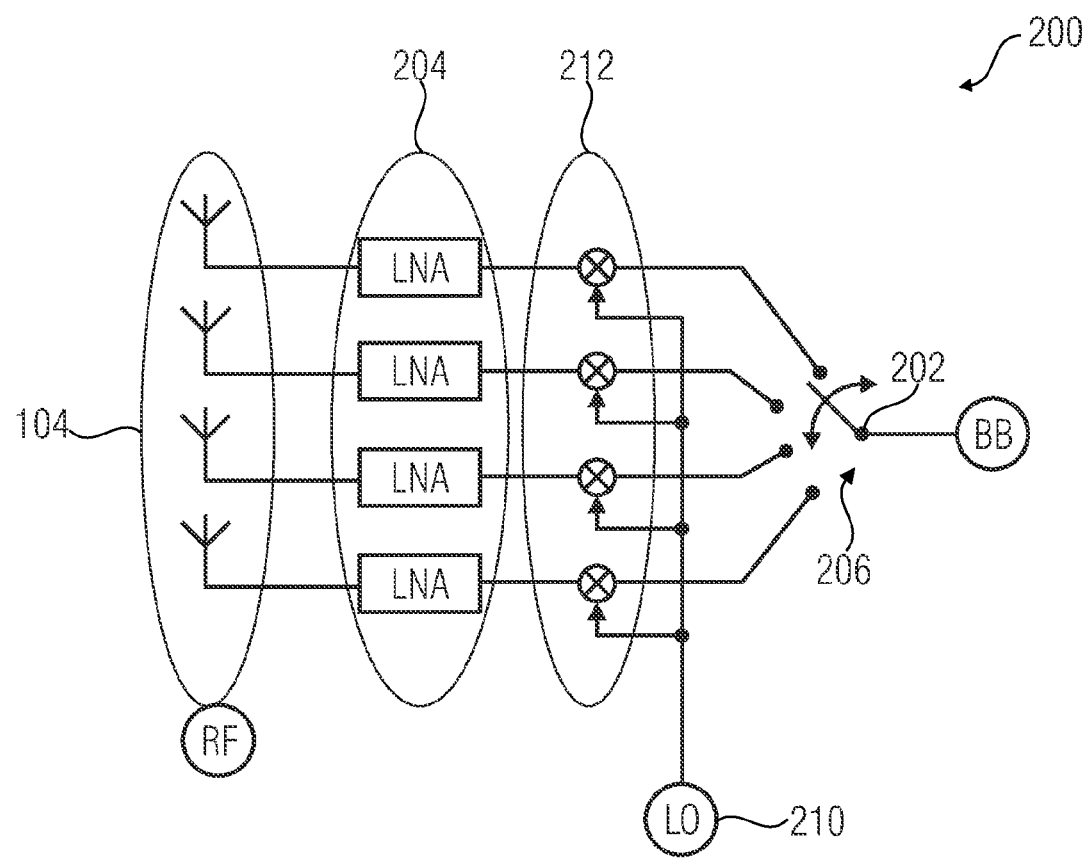
FIG. 16 shows a block diagram of a receive path according to an embodiment of the present invention.

FIG. 16 shows a block diagram of a receive path 200 according to an embodiment of the invention. The receive path 200 comprises the plurality of antennas 104, the plurality of receive path amplifiers 204 connected to the plurality of antennas 104, and the output 202. Furthermore, the receive path 200 can comprise a receive path local oscillator 210 configured to provide a receive path local oscillator signal, a plurality of receive path mixers 212 connected in series between the plurality of receive path amplifiers 204 and the output 202 of the receive path 200, and a receive path switching element 206. Thereby, the plurality of receive path mixers 212 can be connected in series between the plurality of receive path amplifiers 204 and the output 202 of the receive path 200 by means of the receive path switching element 206 such that a plurality of inputs of the receive path switching element 206 are connected to the plurality of receive path mixers 212 and an output of the receive path switching element 206 is connected to the output 202 of the receive path 200. The switching element 206 can be used to select one of the plurality of receive signals (or amplified and down mixed versions thereof). The local oscillator can be running at a frequency of, for example, 1 GHz, 7,5 GHz, 15 GHz, 30 GHz, 60 GHz or 100 GHz.

As shown in FIG. 16, the switching over between the receive signals can be performed at the intermediate frequency (or in the baseband). The receive signals received by the plurality of antennas 104 can be amplified by the plurality of (parallel) receive path amplifiers 204 and down mixed to the intermediate frequency (or baseband). Afterward, the desired receive signal can be selected by means of the switching element 206 (e.g. an electrical or mechanical switch) and be further processed, e.g. by a signal processing unit (not shown).

Figure 17:
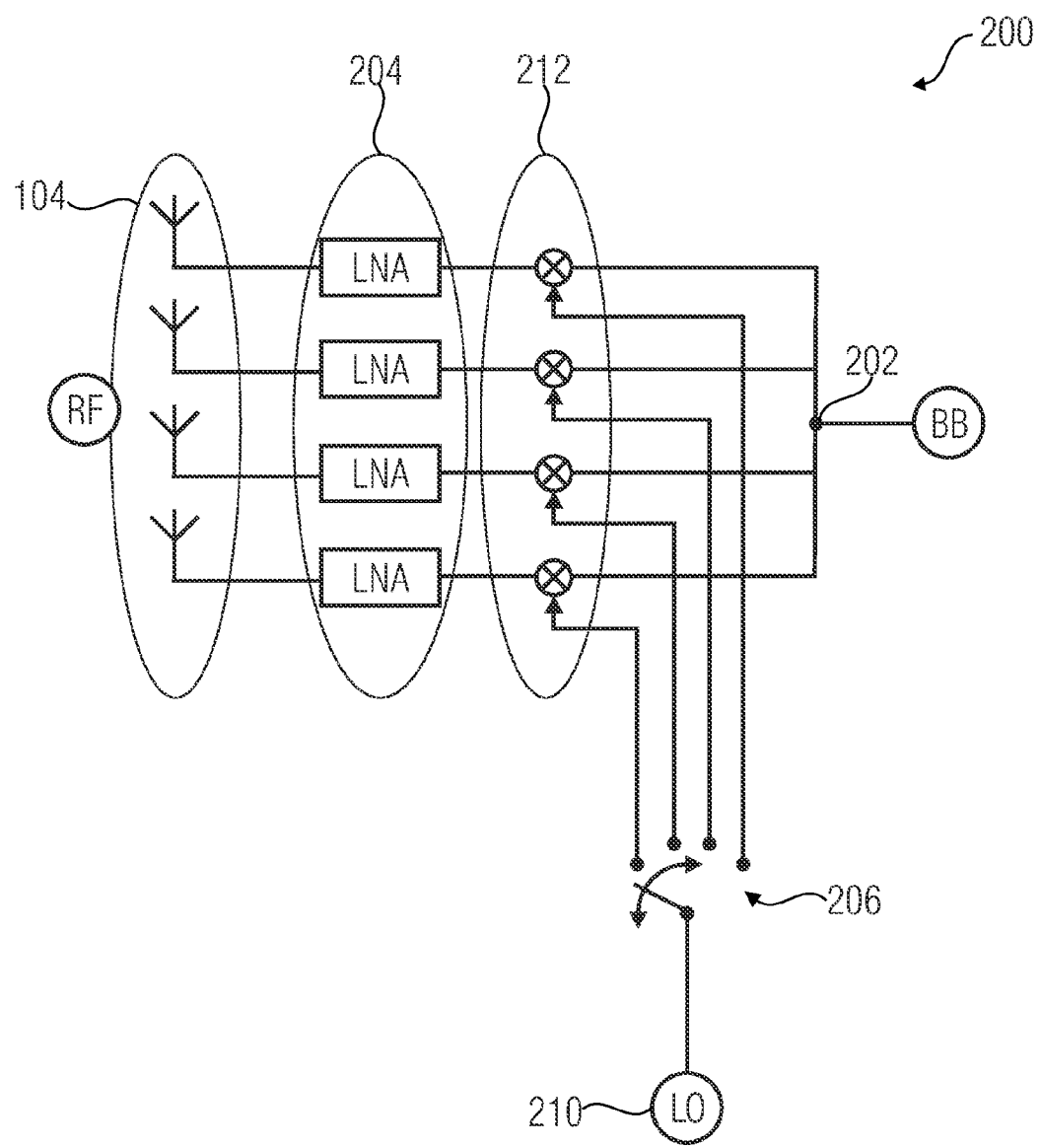
FIG. 17 shows a block diagram of a receive path according to an embodiment of the present invention.

FIG. 17 shows a block diagram of a receive path according to an embodiment of the present invention. The receive path 200 comprises the plurality of antennas 104, the plurality of receive path amplifiers 204 connected to the plurality of antennas 104, and the output 202. Furthermore, the receive path 200 can comprise a receive path local oscillator 210 configured to provide a receive path local oscillator signal, a plurality of receive path mixers 212 connected in series between the plurality of receive path amplifiers 204 and the output 202 of the receive path 200, and a receive path switching element 206. Thereby, the receive path switching element 206 comprises an input connected to the receive path local oscillator 210 and a plurality of outputs connected to the plurality of receive path mixers 212.

In contrast to FIG. 16, where the switching over is performed in the signal path, the switching over between the receive signals is performed in FIG. 17 at the frequency of the local oscillator 210 (e.g. 1 GHz, 7,5 GHz, 15 GHz, 30 GHz, 60 GHz or 100 GHz). Thereby, the plurality of receive path amplifiers 204 and/or plurality of mixers 212 can be switched on or off separately in order to match the line impedances as described above.

Figure 18:
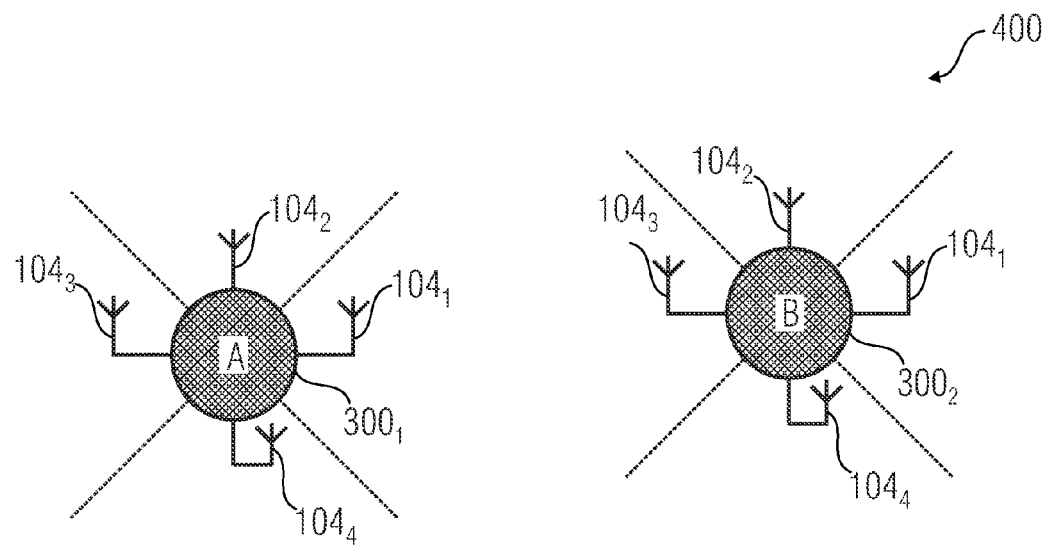
FIG. 18 shows a block diagram of a system comprising a first and a second transceiver according to an embodiment of the present invention.

FIG. 18 shows a block diagram of a system 400 comprising a first and a second transceiver 300₁ and 300₂ according to an embodiment of the present invention. Each of the first and a second transceivers 300₁ and 300₂ can comprise a transmitter 100 and a receive path 200 as described in the above embodiments.

As exemplarily shown in FIG. 18, each of the first and second transceivers 300₁ and 300₂ can comprise four (directional) antennas 104₁ to 104₄ adapted to have different main transmit/receive directions, wherein each antenna of the four antennas 104₁ to 104₄ can be adapted to cover an azimuthal angle of 90° (indicated in FIG. 18 by the dotted lines).

Setting up a connection between the transceivers 300₁ and 300₂ can be challenging when using directional antennas since the transceivers 300₁ and 300₂ do not necessarily know the exact position of each other. In order to set up a connection, it can be necessitated to determine the relative position of the other transceiver and to select an optimal directional antenna and hence an optimal transmission path.

As already mentioned, the power of the plurality of amplified transmit signals is bundled by the transformation unit 106 to one output of the plurality of outputs 110 and hence to one main lobe or beam. Driving the plurality of outputs 110 in parallel is only possible if merely one amplifier of the plurality of amplifiers 102 is active. In that case, the achievable transmission power for each antenna is considerably smaller.

Nevertheless, on the receiver side is possible to receive simultaneously the signals of the plurality of antennas 104 if a matching of impedances is taken into account. However, assuming a constant signal power, the noise power at the at the output 202 of the receive path 200 is increased since the uncorrelated noise levels of the plurality of receive path amplifiers 204 are added.

According to the concept of the present invention, in order to set up the connection between the first and second transceiver 300₁ and 300₂, the increased noise power at the output 202 of the receive path 200 can be compensated by means of code spreading. The signal to noise ratio depends on the implementation of the plurality of (parallel) receive path amplifiers 204, but is in general not better than the signal to noise ratio of a single antenna and the corresponding reduced gain. Thus, the signal to noise ratio is reduced at least by B=10log(N) dB, wherein N is the number of antennas 104. This loss of signal to noise ratio can be compensated by using a direct sequence CDMA (code division multiple access) code having a number of chips $N_C$ of $N_C \geq N$.

Furthermore, according to the concept of the present invention, the procedure of setting up the connection (selecting the appropriate antenna and/or beam) can be accelerated if the relative position of the other transceiver is known. The direction of the other transceiver can be calculated directly by calculating the difference of the positions. Thereby, each transceiver can be configured to determine its position by means of satellite navigation (e.g. GPS) and/or position sensors (e.g. gravitational sensors or a compass). If a separate data channel is available between the transceivers, then the data channel can be used to exchange position data. This data channel can be a unidirectional radio channel having a high spreading factor and thus a high spreading gain since the amount of data to be exchanged can be small.

Figure 19:
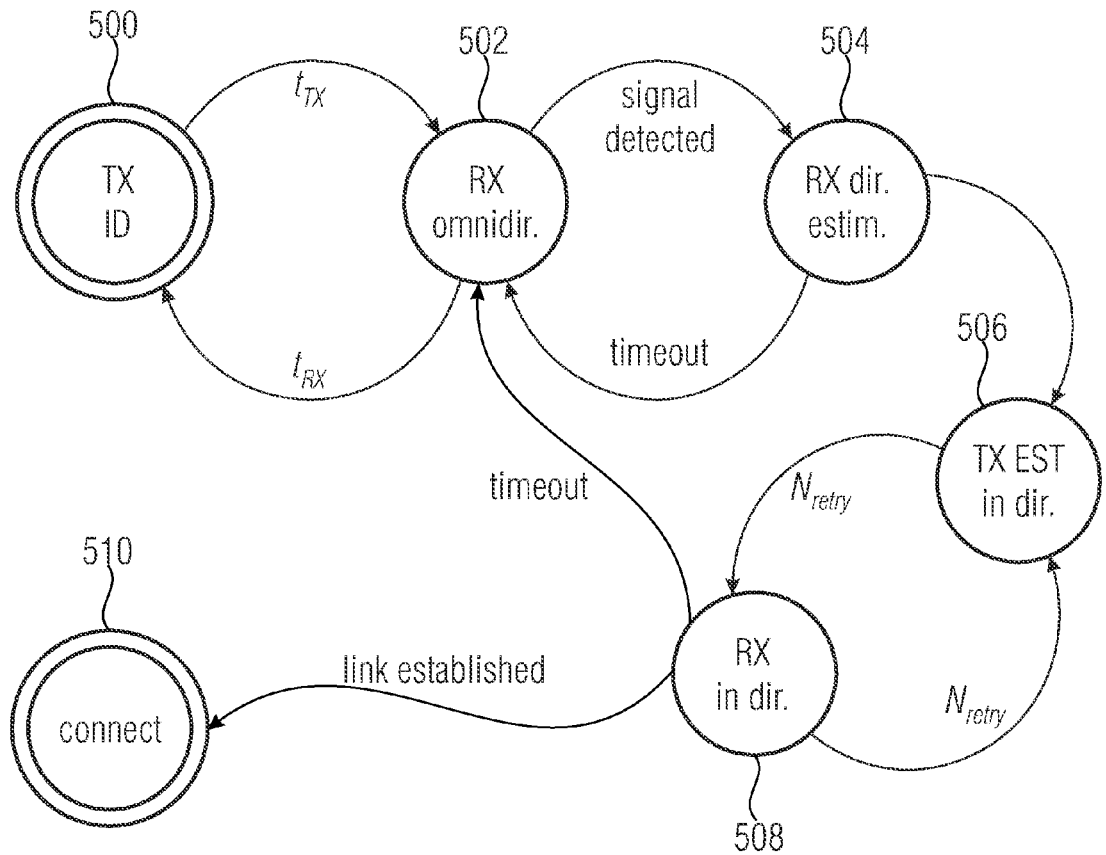
FIG. 19 shows a state diagram of a method for setting-up a connection between a first and a second transceiver according to an embodiment of the present invention.

FIG. 19 shows a state diagram of a method for setting up a connection between the first and second transceiver 300₁ and 300₂ shown in FIG. 18. Thereby, it is assumed by way of example that the first transceiver 300₁ performs the following steps. Naturally, the following steps can also be performed by the second transceiver 300₂.

At the start the first transceiver 300₁ can be in a first state (TX ID) 500. In this state, the first transceiver 300₁ can transmit subsequently with all antennas 104 a certain spreading code sequence. After a given time span $t_{TX}$ the first transceiver 300₁ can pass over to a second state (RX omnidir.) 502 in which the first transceiver 300₁ can use all antennas 104 to scan for signals of the second transceiver 300₂. If no second transceiver 300₂ can be detected within a given time span $t_{RX}$, then the first transceiver 300₁ can pass over again to the first state (TX ID) 500.

If the second transceiver 300₂ is detected, then the first transceiver 300₁ can determine the direction of the second transceiver 300₂ by switching the antennas 104 individually (e.g. to the receiver or signal processing unit) until the strongest receive signal is detected. Thereby, it may have to be taken into account that the identifier is only transmitted in limited time slots.

If the characteristics (main lobes) of adjacent antennas 104 overlap, then scanning can be accelerated. For example, to begin with, the antennas not having overlapping characteristics (main lobes) may be scanned (e.g. starting with a random antenna). Afterwards, the remaining antennas may be scanned. Moreover, as soon as a receive signal is detected, the adjacent antennas can be scanned in order to detect the receive maxima.

As soon as the first transceiver 300₁ detects a receive signal of the second transceiver 300₂, the first transceiver 300₁ can pass over to a third state (RX dir. estim.) 504 in which an improved (or even optimal) beam form can be determined, e.g. by trying. Afterwards, the first transceiver 300₁ can transmit its own identifier in the direction of the second transceiver 300₂ in a fourth state (TX EST in dir.) 506 and wait for a confirmation from the second transceiver 300₂ in a fifth state (RX in dir.) 508. This procedure can be repeated for N times and if no reply is received then the first transceiver can pass over to the second state (RX omnidir.) 502, or in other words, setting up the connection can be started over again.

If the first transceiver 300₁ receives a confirmation from the second transceiver 300₂, then the first transceiver 300₁ can pass over to a sixth state (connect) 510 in which the connection (or link) to the second transceiver 300₂ is established.

The selection of the different time slots can be matched such that it can be guaranteed that the first and second transceivers 300₁ and 300₂ (e.g. two arbitrary receivers that are operated asynchronously) are not transmitting continuously at the same time and hence may not find each other. Therefore, the timespan $t_{RX}$ for signal scanning can be extended by random timespans respectively.

Further embodiments of the present invention provide a method for operating a transmitter, wherein the transmitter comprises a plurality of amplifier circuits, a plurality of antennas adapted to have different main transmit directions, and a transformation unit comprising a plurality of inputs connected to the plurality of amplifier circuits and a plurality of outputs connected to the plurality of antennas. In a first step, the plurality of amplified transmit signals present at the plurality of inputs of the transformation unit are transformed into a combined power transmit signal. In a second step, the combined power transmit signal is provided at one of the plurality of outputs of the transformation unit.

Embodiments of the present invention provide a transmitter configured to bundle simultaneously a transmit signal (or transmit signals) in the direction of one or more receive stations. Thereby, the transmitter can be configured to cover an azimuthal angle of 360°. Furthermore, the transmitter can be configured to adapt the main lobe(s) to the position(s) of the receive station(s), i.e. changing the azimuth angle. The transmitter can be configured to estimate the azimuth angle(s) in order to provide a dynamic alignment of the main lobe(s). In addition, the transmitter can be capable of providing sufficient transmit power for providing the just mentioned functionality.

Further embodiments of the present invention provide a receive path that is configured to form simultaneously one or more main lobes in the direction of one or more transmitters. Thereby, the receive path can be configured to cover an azimuthal angle of 360°. Furthermore, the receive path can be configured to adapt the main lobe(s) to the position(s) of the transmitter(s), i.e. changing the azimuth angle. The receive path can be configured to estimate the azimuth angle(s) in order to provide a dynamic alignment of the main lobe(s).

The herein presented concept for parallel amplification and switching over or distribution of the transmit signal to one or more outputs has specific advantages compared to conventional solutions. The transmitter 100 comprising a high frequency lens as transformation unit comprises small losses compared to traditional power combiner networks. In addition, the size of the high frequency lens increases (only) linearly with the number of inputs and outputs and not quadratically as it is the case when using cascaded structures of simple 2:1 power dividers.

The transmitter 100 according to the concept of the present invention contains no mechanically moving components. Thus, the transmitter 100 can be assembled in a compact manner and be robust against external influences. In addition, the transmitter 100 according to the concept of the present invention does not contain any consumables such that the transmitter 100 does not necessitate (additional) maintenance and is in principle not limited in life time. Furthermore, the transmitter 100 is able to switch over between the outputs without delay since no mechanical components have to be moved.

In contrast to some state of the art solutions, the transmitter 100 does not necessitate an electronic switch due to the transformation unit 106. Thus, the presented solution has lower losses. In addition, the transmitter 100 is capable of generating any distribution of the signals at the outputs. When using electronic switches this can be realized only with very complex circuits. However, when generating arbitrary signal distributions at the plurality of outputs 110 parallelization in amplification is reduced since the plurality of amplifier circuits 102 are not driven with signals having the same absolute values.

When using circular beamforming arrays not all antenna elements (or radiating elements) can contribute to the generation of the signal since each antenna element is driven by an individual amplifier and since the different antenna elements may shield each other. In contrast to this, in embodiments all amplifiers 102 contribute to the generation of the combined power output signal.

Moreover, in order to calculate the beamforming coefficients, knowledge about the exact positioning of the antenna layout is necessitated. Furthermore, the calculation of the beamforming coefficients has to be adapted to the antenna layout. In contrast to this, the transformation function according to the concept of the present invention can be equivalent to the (fast) Fourier transformation that is efficient to implement and independent of the position of the plurality of antennas.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. Transmitter, comprising:
a plurality of amplifier circuits;
a plurality of antennas adapted to comprise different main transmit directions; and
a transformation unit comprising a plurality of inputs connected to the plurality of amplifier circuits and a plurality of outputs connected to the plurality of antennas, wherein the transformation unit is configured to transform a plurality of amplified transmit signals present at the plurality of inputs into a combined power transmit signal and to provide the combined power transmit signal at only a single output of the plurality of outputs;
wherein the transformation unit is configured to transform the plurality of amplified transmit signals into the combined power transmit signal such that the single output at which the combined power transmit signal is provided is defined by amplitudes and/or phases of the plurality of amplified transmit signals; and
wherein the plurality of amplifier circuits are configured to amplify a transmit signal with controllable gains and/or controllable phase shifts in order to acquire the plurality of amplified transmit signals, wherein the transmitter is configured to control the gains and/or phase shifts such that the plurality of amplifier circuits provide the plurality of amplified transmit signals with predefined amplitudes and/or phases, wherein the transformation unit is configured to provide the combined power transmit signal at the single output defined by the amplitudes and/or phases of the plurality of amplified transmit signals.

2. Transmitter according to claim 1, wherein the transformation unit is configured to transform the plurality of amplified transmit signals into the combined power transmit signal by means of an orthogonal transformation or a discrete Fourier transformation.

3. Transmitter according to claim 1, wherein the transformation unit is a high frequency lens, a Rotman lens or a Butler matrix.

4. Transmitter according to claim 1, wherein the transmitter further comprises:
a local oscillator configured to provide a local oscillator signal; and
a local oscillator transformation unit comprising a plurality of inputs and a plurality of outputs, wherein the local oscillator transformation unit is configured to transform the local oscillator signal present at one of the plurality of inputs into a plurality of phase shifted local oscillator signals such that the input at which the local oscillator signal is present defines the phases of the plurality of phase shifted local oscillator signals and to provide the plurality of phase shifted local oscillator signals at the plurality of outputs;
wherein the plurality of amplifier circuits comprise control inputs connected to the plurality of outputs of the local oscillator transformation unit, wherein the plurality of amplifier circuits are configured to acquire the plurality of amplified transmit signals based on mixing a baseband or intermediate frequency transmit signal or amplified versions thereof with the plurality of phase shifted local oscillator signals present at the control inputs, thereby applying the phases of the plurality of phases shifted local oscillator signals to the plurality of amplified transmit signals.

5. Transmitter according to claim 1, wherein the transmitter further comprises:
a local oscillator configured to provide a local oscillator signal; and
a plurality of controllable phase shifters connected to the local oscillator and configured to provide a plurality of phase shifted local oscillator signals comprising predefined phases;
wherein the plurality of amplifier circuits comprise control inputs connected to the plurality of controllable phase shifters, wherein the plurality of amplifier circuits are configured to acquire the plurality of amplified transmit signals based on mixing a baseband or intermediate frequency transmit signal or amplified versions thereof with the plurality of phase shifted local oscillator signals present at the control inputs, thereby applying the phases of the plurality of phases shifted local oscillator signals to the plurality of amplified transmit signals.

6. Transceiver, comprising:
a transmitter according to claim 1; and
a receive path, wherein the receive path comprises:
an output of the receive path; and
a plurality of receive path amplifiers connected in series between the output of the receive path and the plurality of antennas, wherein the plurality of antennas are adapted to comprise different main receive directions in order to receive a plurality of receive signals from the different main receive directions.

7. Transceiver according to claim 6, wherein the plurality of receive path amplifiers are switchable between a switch on state and a switch off state, wherein each receive path amplifier of the plurality of receive path amplifiers is configured to provide at its output an impedance that is in the switch on state adapted to a specific impedance of the receive path and that is in the switch-off state at least by a factor of 10 higher than the characteristic impedance of the receive path.

8. Transceiver according to claim 6, wherein the receive path further comprises:

a receive path local oscillator configured to provide a receive path local oscillator signal;

a plurality of receive path mixers connected in series between the plurality of receive path amplifiers and the output of the receive path; and a switching element;

wherein the receive path switching element comprises an input connected to the receive path local oscillator and a plurality of outputs connected to the plurality of receive path mixers; or wherein the plurality of receive path mixers are connected in series between the plurality of receive path amplifiers and the output of the receive path by means of the receive path switching element such that a plurality of inputs of the receive path switching element are connected to the plurality of receive path mixers and an output of the receive path switching element is connected to the output of the receive path.

9. System, comprising:

a first and a second transceiver according to claim 6;

wherein the first transceiver is configured to transmit a transmit signal comprising a spreading code subsequently with each antenna of the plurality of its antennas in order to establish a connection between the first and second transceiver; and wherein the second transceiver is configured to receive simultaneously a plurality of receive signals with the plurality of its antennas, to derive a direction from which the transmit signal is received based on the plurality of receive signals, and to select the antenna of the plurality of antennas comprising the main receive directions that corresponds to the direction from which the transmit signal is received, in order to establish the connection between the first and second transceiver.

10. Method for operating a transmitter, wherein the transmitter comprises a plurality of amplifier circuits, a plurality of antennas adapted to comprise different main transmit directions, and a transformation unit comprising a plurality of inputs connected to the plurality of amplifier circuits and a plurality of outputs connected to the plurality of antennas, wherein the method comprises:

amplifying a transmit signal with controllable gains and/or controllable phase shifts in order to acquire the plurality of amplified transmit signals;

controlling the gains and/or phase shifts such that the plurality of amplifier circuits provide the plurality of amplified transmit signals with predefined amplitudes and/or phases;

transforming the plurality of amplified transmit signals present at the plurality of inputs of the transformation unit into a combined power transmit signal; and providing the combined power transmit signal at only a single output of the plurality of outputs of the transformation unit;

wherein transforming the plurality of transmit signals comprises transforming the plurality of amplified transmit signals into the combined power transmit signal such that the single output at which the combined power transmit signal is provided is defined by amplitudes and/or phases of the plurality of amplified transmit signals; and wherein providing the combined power transmit signal comprises providing the combined power transmit signal at the single output defined by the amplitudes and/or phases of the plurality of amplified transmit signals.

11. A non-transitory computer readable medium including a computer program comprising a program code for performing, when running on a computer or microprocessor, a method according to claim 10.

* * * * *